US011904974B2

(12) United States Patent
Shibuya et al.

(10) Patent No.: US 11,904,974 B2
(45) Date of Patent: Feb. 20, 2024

(54) OVERTURN-NOTIFICATION-RIDER-INFORMING-DEVICE AND LEANING VEHICLE

(71) Applicant: YAMAHA HATSUDOKI KABUSHIKI KAISHA, Iwata (JP)

(72) Inventors: Hiroshi Shibuya, Iwata (JP); Kotaro Onishi, Iwata (JP); Tomohiro Takeuchi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 338 days.

(21) Appl. No.: 16/592,852

(22) Filed: Oct. 4, 2019

(65) Prior Publication Data
US 2020/0031300 A1 Jan. 30, 2020

Related U.S. Application Data

(63) Continuation of application No. PCT/JP2018/017410, filed on May 1, 2018.

(30) Foreign Application Priority Data

Jun. 8, 2017 (JP) .................. 2017-113730

(51) Int. Cl.
*B62J 50/21* (2020.01)
*B60R 21/0136* (2006.01)
*B60W 30/095* (2012.01)
*B62K 11/00* (2006.01)
*B62J 3/14* (2020.01)
(Continued)

(52) U.S. Cl.
CPC .......... *B62J 50/21* (2020.02); *B60R 21/0136* (2013.01); *B60W 30/0953* (2013.01); *B62J 3/14* (2020.02);
(Continued)

(58) Field of Classification Search
CPC .......... B60R 21/0136; B60W 30/0953; B60W 2050/143; B62K 11/00; B62J 6/24; B62J 3/14
See application file for complete search history.

(56) References Cited

U.S. PATENT DOCUMENTS 9,580,009 B1 * 2/2017 Lenker ................. G08B 25/016
2016/0167569 A1 * 6/2016 Kizaki ..................... B60Q 1/46
340/475

(Continued)

FOREIGN PATENT DOCUMENTS

CN 103101477 B 8/2016
CN 106604848 A 4/2017
(Continued)

OTHER PUBLICATIONS

Rudolf-Andreas Probst, "With the optional 'Intelligent Emergency Call', BMW Motorrad is offering a motorcycle eCall system for the first time. Fast help in the case of an accident or an emergency situation.", [online] May 30, 2016, BMW Group, [Search Date: Nov. 9, 2016], Internet: URL: https://www.press.bmwgroup.com/global/article/detail/T0259550EN/.
(Continued)

*Primary Examiner* — Christian Chace
(74) *Attorney, Agent, or Firm* — Rabin & Berdo, P.C.

(57) ABSTRACT

An overturn-notification-rider-informing-device includes: an acquisition section that acquires notification preparation information indicating that a leaning-vehicle-overturn-notification-system is preparing to notify of overturn occurrence information to outside of the leaning vehicle, or notification completed information indicating that the leaning-vehicle-overturn-notification-system has notified of the overturn occurrence information to outside of the leaning vehicle; and an actuation section that, based on the notification preparation information or the notification completed information,
(Continued)

causes light to be radiated or sound to be generated by actuating at least one component among a front light and the like in an operating state that is different from an operating state of the relevant component at a time when, or immediately before, the leaning vehicle changes from a travelling state to an overturned state, and thereby informs of the overturn notification state to the rider.

12 Claims, 7 Drawing Sheets

(51) Int. Cl.
*B62J 6/24* (2020.01)
*B60W 50/14* (2020.01)

(52) U.S. Cl.
CPC ................. *B62J 6/24* (2020.02); *B62K 11/00* (2013.01); *B60W 2050/143* (2013.01)

(56) References Cited

U.S. PATENT DOCUMENTS

| | | | |
|---|---|---|---|
| 2017/0151922 A1* | 6/2017 | Obuchi | B60R 21/0136 |
| 2017/0158118 A1* | 6/2017 | Lenker | B62J 3/00 |
| 2018/0265059 A1* | 9/2018 | D'Addetta | B60T 8/261 |
| 2018/0312105 A1* | 11/2018 | Bartell | B60Q 1/2696 |
| 2019/0147746 A1* | 5/2019 | Wernicke | G08B 25/016 |
| | | | 340/436 |

FOREIGN PATENT DOCUMENTS

| | | |
|---|---|---|
| EP | 2518710 A1 | 10/2012 |
| EP | 3162639 A1 | 5/2017 |
| JP | 2001-030971 A | 2/2001 |
| JP | 2001-184580 A | 7/2001 |
| JP | 2013-052752 A | 3/2013 |
| KR | 10-1064145 B1 | 9/2011 |
| TW | M486580 U | 9/2014 |
| TW | M487866 U | 10/2014 |
| TW | 201811596 A | 4/2018 |
| WO | 2015/198786 A1 | 12/2015 |

OTHER PUBLICATIONS

Taiwan Patent Office, Office Action, Patent Application Serial No. TW107116967, dated Mar. 8, 2019.

* cited by examiner

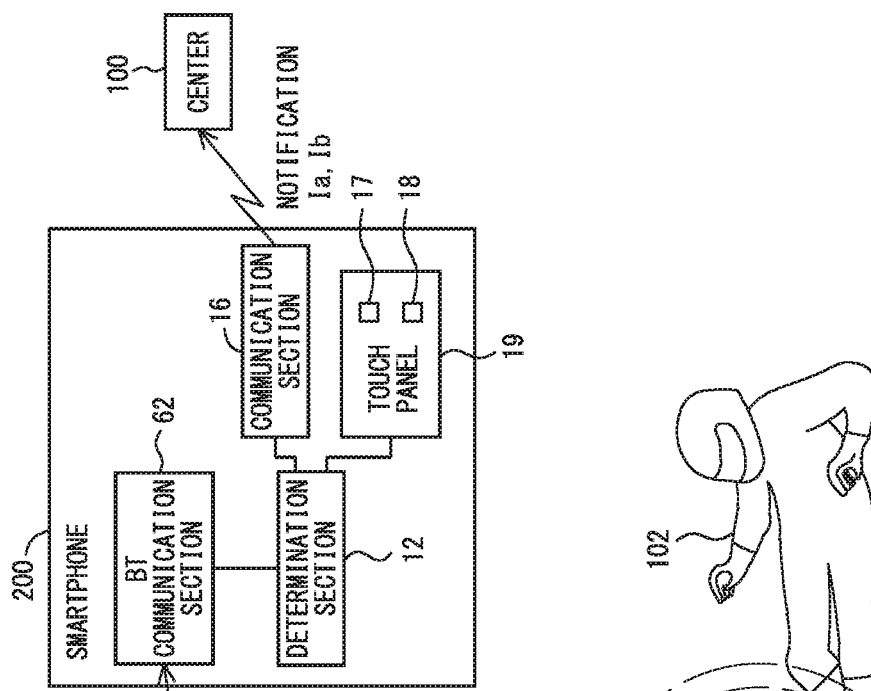
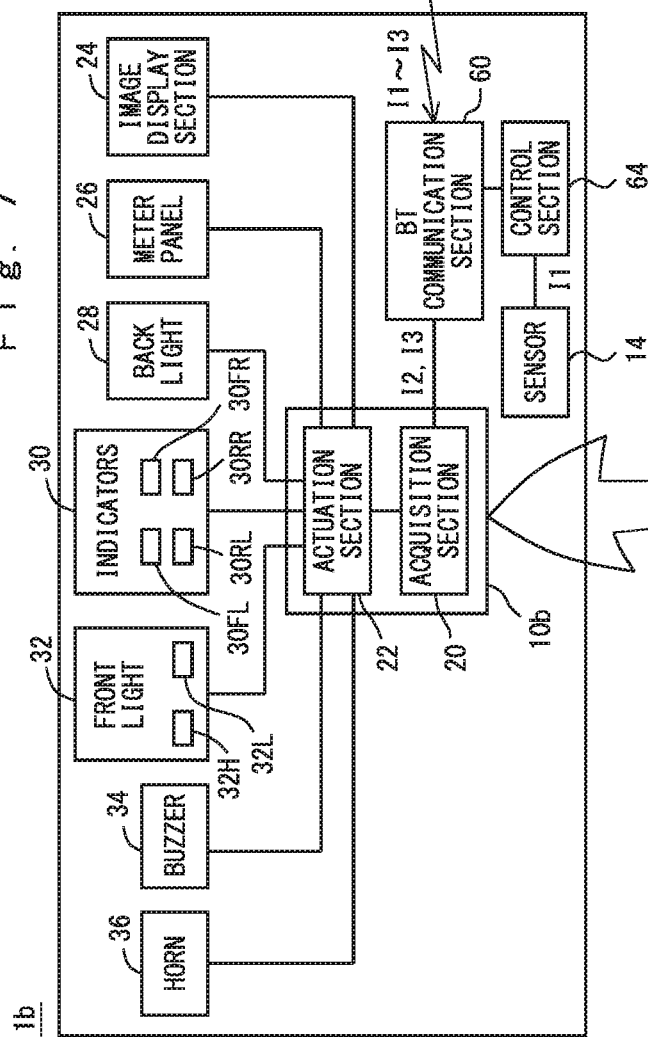
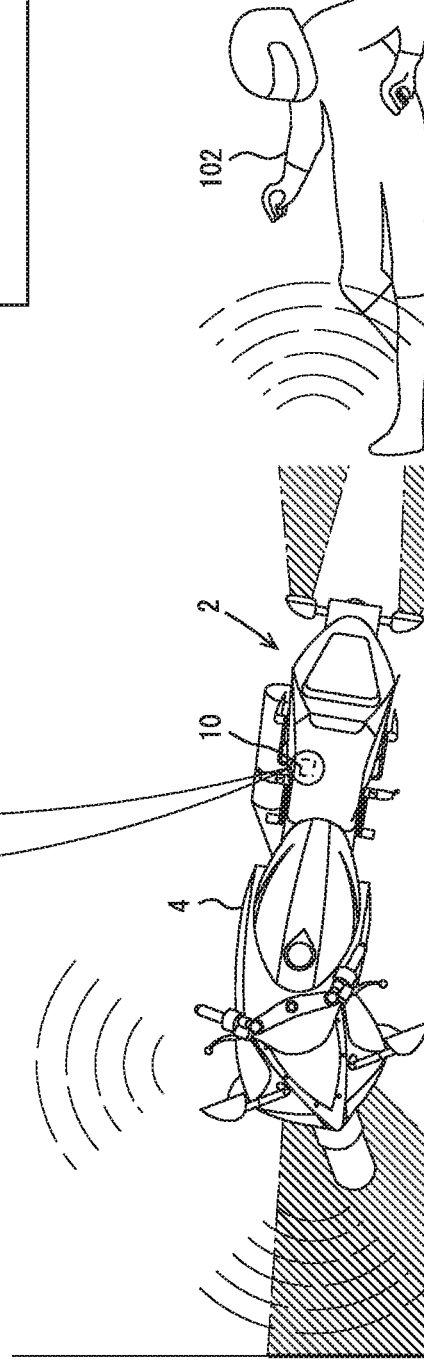
Fig. 7

OVERTURN-NOTIFICATION-RIDER-INFORMING-DEVICE AND LEANING VEHICLE

CROSS-REFERENCE TO RELATED APPLICATION

This application is a continuation of International Application PCT/JP2018/017410 filed on May 1, 2018, which claims priority from Japanese Patent Application No. 2017-113730 filed on Jun. 8, 2017. The contents of each of the identified applications are entirely incorporated herein by reference.

TECHNICAL FIELD

The present invention relates to an overturn-notification-rider-informing-device and a leaning vehicle.

BACKGROUND ART

There is a possibility that a leaning vehicle such as a motorcycle will overturn during ordinary travel. In Non Patent Literature 1, a notification system is proposed that, when a leaning vehicle overturns, notifies the fact that the leaning vehicle has overturned to a third party by radio communication means.

However, in a leaning vehicle, there is a possibility that the rider will be separated from the leaning vehicle when the leaning vehicle overturns. An automatic notification device for a vehicle disclosed in Patent Literature 1 is known as an invention that notifies the rider that the occurrence of overturning has been notified to a third party in a case where the rider is separated from the leaning vehicle.

In FIG. 11 and FIG. 12 of Patent Literature 1 (identified further on), a helmet 31 that includes a radio telephone 5 and a speaker 7 is illustrated. If a two-wheeled vehicle has an accident, the radio telephone 5 of the helmet 31 automatically notifies of the occurrence of the accident to a third party. The speaker 7 performs audio guidance to the effect that the rider can cancel the notification. By this means the rider can decide whether or not to cancel the notification. In FIG. 13 of Patent Literature 1, the helmet 31 that includes the speaker 7 is illustrated. Further, in FIG. 13 of Patent Literature 1, a two-wheeled vehicle that includes the radio telephone 5 is illustrated. If the two-wheeled vehicle has an accident, the radio telephone 5 of the two-wheeled vehicle automatically notifies of the occurrence of the accident to a third party. The speaker 7 provides guidance to inform the rider that it is possible to cancel the notification. By this means the rider can decide whether or not to cancel the notification.

CITATION LIST

Non Patent Literature

Non Patent Literature 1: Rudolf-Andreas Probst, "With the optional 'Intelligent Emergency Call', BMW Motorrad is offering a motorcycle eCall system for the first time. Fast help in the case of an accident or an emergency situation.", [online], 30 May 2016, BMW Group, [Search Date: 9 Nov. 2016], Internet: <URL: https://www.press.bmwgroup.com/global/article/detail/T0259550EN/>

PATENT LITERATURE

Patent Literature 1: Japanese Patent Laid-Open No. 2001-184580

SUMMARY OF INVENTION

An object of the present invention is to provide, in a leaning vehicle, an overturn-notification-rider-informing-device that, by a different method to a conventional method, can inform a rider who is separated from the leaning vehicle that preparation is underway to notify of the occurrence of overturning to an outside party or that the occurrence of overturning has been notified of to an outside party, and also to provide a leaning vehicle.

The inventors of the present application conducted studies regarding leaning vehicles that were directed towards informing a rider who is separated from a leaning vehicle that a notification is being prepared or that a notification has been transmitted, by a different method to a conventional method.

The inventors of the present application conducted studies regarding methods for informing a rider who is separated from a leaning vehicle that preparation is underway to notify of the occurrence of overturning of the leaning vehicle or that occurrence of overturning of the leaning vehicle has been notified of, that are different from a conventional method. To this end, the inventors of the present application carried out analyses and studies regarding the circumstances when the state of a leaning vehicle changes from a travelling state to an overturned state. The present inventors found that, even when the state of a leaning vehicle has changed to an overturned state, there are cases where the rider wishes to notify of the occurrence of overturning to an outside party and there are cases where a rider does not wish to notify of the occurrence of overturning to an outside party. In such cases, the rider desires to know whether or not a notification of the occurrence of overturning is being prepared or the occurrence of overturning has been notified of to an outside party.

The studies conducted regarding overturned states show that a leaning vehicle overturns in a manner in which the right side face or left side face of the leaning vehicle is positioned at the bottom. The portion of the leaning vehicle that is visible when the rider looks at the leaning vehicle differs depending on the positional relationship between the rider and the leaning vehicle. However, the inventors of the present application noticed that the front face, rear face, top surface or undersurface of the leaning vehicle can be seen by the rider when the leaning vehicle is in an overturned state. Here, the terms "front face", "rear face", "top surface" and "undersurface" of the leaning vehicle refer to the front face, rear face, top surface and undersurface, respectively, of the leaning vehicle when the leaning vehicle is in an upright state. In addition, the inventors of the present application noticed that, when a leaning vehicle is in an overturned state, the rider can visually recognize light that a pre-existing lighting device emits. Further, the inventors of the present application noticed that the rider can also hear a sound that a pre-existing horn or buzzer generates. The reason that a rider can visually recognize light that a lighting device emits, and the reason that a rider can hear sound that a horn or buzzer generates is that the lighting device and the horn or buzzer are disposed on a center line of the leaning vehicle, and not on a side face of the leaning vehicle. The term "center line" of the leaning vehicle refers to a line that passes through the center in the left-right direction of the leaning vehicle when the leaning vehicle is viewed from the frontward direction, backward direction, upward direction or downward direction. Therefore, the inventors of the present application conceived of the idea that a lighting device, a horn or a buzzer can be utilized to inform a rider who is separated from a leaning vehicle that preparation is underway to notify of the occurrence of overturning to outside of the leaning vehicle or that the occurrence of overturning was notified of to outside of the leaning vehicle.

To solve the problem described above, the present invention employs the following configurations.

(1) An overturn-notification-rider-informing-device applied to a leaning-vehicle-overturn-notification-system, the leaning-vehicle-overturn-notification-system being configured to notify of overturn occurrence information indicating that a leaning vehicle changed from a travelling state to an overturned state to outside of the leaning vehicle by radio communication, the overturn-notification-rider-informing-device being mounted in the leaning vehicle, the leaning vehicle including: a vehicle body that leans to the left when turning left and leans to the right when turning right; and at least one of a front light that illuminates an area in front of the vehicle body when the vehicle body is in an upright state, indicators, a back light, a meter panel, an image display section, a horn and a buzzer;

the overturn-notification-rider-informing-device including:

a leaning-vehicle-overturn-notification-information-acquisition-section that acquires notification preparation information indicating that the leaning-vehicle-overturn-notification-system is preparing to notify of the overturn occurrence information to outside of the leaning vehicle by the radio communication, or notification completed information indicating that the leaning-vehicle-overturn-notification-system has notified of the overturn occurrence information to outside of the leaning vehicle by the radio communication; and an overturn-notification-rider-informing-actuation-section that, based on the notification preparation information or the notification completed information, causes light to be radiated or sound to be generated in a horizontal direction from the leaning vehicle that is in an overturned state by actuating at least one of the front light, the indicators, the back light, the meter panel, the image display section, the horn or the buzzer in an operating state that is different from an operating state at a time when, or immediately before, the leaning vehicle changes from a travelling state to an overturned state, and thereby informs a rider of an overturn notification state indicative of a status of notification of the overturn occurrence information.

The overturn-notification-rider-informing-device of (1) can inform a rider who is separated from a leaning vehicle that preparation is underway to notify overturn occurrence information or that notification of overturn occurrence information has been performed. First, a case where the overturn-notification-rider-informing-device can inform a rider who is separated from a leaning vehicle that preparation is underway to notify of overturn occurrence information will be described. More specifically, the leaning-vehicle-overturn-notification-information-acquisition-section acquires notification preparation information indicating that the leaning-vehicle-overturn-notification-system is preparing to notify of overturn occurrence information to outside of the leaning vehicle. Based on the notification preparation information that the leaning-vehicle-overturn-notification-information-acquisition-section acquired, the overturn-notification-rider-informing-actuation-section actuates at least one of a front light, indicators, a back light, a meter panel, an image display section, a horn or a buzzer in an operating state that is different from the operating state thereof at a time when, or immediately before, the leaning vehicle changed from a travelling state to an overturned state. Therefore, a light radiation state or a sound generation state at a time when, or immediately before, the leaning vehicle changed from a travelling state to an overturned state differs from a light radiation state or a sound generation state at a time when preparation is underway to notify of overturn occurrence information to outside of the leaning vehicle. Thus, by recognizing a change in the light radiation state or the sound generation state, a rider who is separated from the leaning vehicle can know that preparation is underway to notify overturn occurrence information to outside of the leaning vehicle. Further, by recognizing a change in the light radiation state or the sound generation state, a third party present in the area around the leaning vehicle can also know that preparation is underway to notify of overturn occurrence information to outside of the leaning vehicle. Note that, in this specification the term "third party present in the area around the leaning vehicle" means a person other than a rider who can visually recognize the leaning vehicle.

Next, a case where the overturn-notification-rider-informing-device can inform a rider who is separated from the leaning vehicle that overturn occurrence information was notified of to outside of the leaning vehicle will be described. More specifically, the leaning-vehicle-overturn-notification-information-acquisition-section acquires notification completed information indicating that the leaning-vehicle-overturn-notification-system has notified of overturn occurrence information to outside of the leaning vehicle. Based on the notification completed information that the leaning-vehicle-overturn-notification-information-acquisition-section acquired, the overturn-notification-rider-informing-actuation-section actuates at least one of the front light, the indicators, the back light, the meter panel, the image display section, the horn or the buzzer in an operating state that is different from the operating state thereof at a time when, or immediately before, the leaning vehicle changed from a travelling state to an overturned state. Therefore, a light radiation state or a sound generation state at a time when, or immediately before, the leaning vehicle changed from a travelling state to an overturned state differs from a light radiation state or a sound generation state at a time when overturn occurrence information has been notified of to outside of the leaning vehicle. Thus, by recognizing a change in the light radiation state or the sound generation state, a rider who is separated from the leaning vehicle can know that overturn occurrence information was notified of to outside of the leaning vehicle. Further, by recognizing a change in the light radiation state or the sound generation state, a third party present in the area around the leaning vehicle can also know that overturn occurrence information was notified of to outside of the leaning vehicle.

Note that it suffices that the overturn-notification-rider-informing-device of (1) can inform the rider who is separated from the leaning vehicle of at least one of a fact that preparation is underway to notify of overturn occurrence information and a fact that overturn occurrence information was notified of. Hence, it suffices that, based on at least one of notification preparation information and notification completed information, the overturn-notification-rider-informing-actuation-section of the overturn-notification-rider-informing-device of (1) actuates at least one of the front light, the indicators, the back light, the meter panel, the image display section, the horn or the buzzer in an operating state that is different from the operating state thereof at a time when, or immediately before, the leaning vehicle changed from a travelling state to an overturned state.

Further, according to the overturn-notification-rider-informing-device of (1), the probability that the rider will know the overturn notification state increases. More specifically, the overturn-notification-rider-informing-actuation-section causes at least one of a front light, indicators, a back light, a meter panel, an image display section, a horn or a buzzer to radiate light or generate sound in a horizontal direction from the leaning vehicle in an overturned state. There is a high probability that, in an overturned state, the leaning vehicle will assume a posture in which a normal vector of the right side face or the left side face extends downward. Further, there is a high probability that the rider who is separated from the leaning vehicle will be on the ground. Therefore, there is a high probability that light that is radiated in a horizontal direction or sound that is generated in a horizontal direction will reach the rider. Hence, there is a high probability that the rider can know the overturn notification state based on the light that is radiated in a horizontal direction or the sound that is generated in a horizontal direction. There is also a high probability that a third party present in the area around the leaning vehicle can know the overturn notification state based on the light that is radiated in a horizontal direction or the sound that is generated in a horizontal direction.

(2) The overturn-notification-rider-informing-device according to (1), wherein:

in a case where the leaning-vehicle-overturn-notification-information-acquisition-section no longer acquires the notification preparation information and the notification completed information, the overturn-notification-rider-informing-actuation-section actuates at least one of the front light, the indicators, the back light, the meter panel, the image display section, the horn or the buzzer in an operating state that is different from an operating state in a state in which the leaning-vehicle-overturn-notification-information-acquisition-section is acquiring the notification preparation information or the notification completed information, and thereby the overturn-notification-rider-informing-device informs the rider that the leaning-vehicle-overturn-notification-system cancelled preparation for notifying of the overturn occurrence information to outside of the leaning vehicle by the radio communication or that the leaning-vehicle-overturn-notification-system cancelled notification of the overturn occurrence information that was notified of to outside of the leaning vehicle by the radio communication.

The overturn-notification-rider-informing-device of (2) can inform a rider who is separated from a leaning vehicle that preparation for notifying of the overturn occurrence information was cancelled or that notification of the overturn occurrence information that was notified of was cancelled. More specifically, in a case where the leaning-vehicle-overturn-notification-information-acquisition-section no longer acquires notification preparation information and notification completed information, the overturn-notification-rider-informing-actuation-section can determine that preparation for notifying of the overturn occurrence information or notification of the overturn occurrence information that was notified was cancelled. Therefore, the overturn-notification-rider-informing-actuation-section places at least one of the front light, the indicators, the back light, the meter panel, the image display section, the horn or the buzzer in an operating state that is different from a state thereof when the leaning-vehicle-overturn-notification-information-acquisition-section is acquiring the notification preparation information or the notification completed information. By this means, a light radiation state or a sound generation state when preparing to notify of overturn occurrence information or when overturn occurrence information has been notified of are different from a light radiation state or a sound generation state when preparation for notifying of overturn occurrence information has been cancelled or when the notification of overturn occurrence information that was notified of has been cancelled. As a result, by recognizing a change in the light radiation state or the sound generation state, the rider who is separated from the leaning vehicle can know that preparation for notifying of overturn occurrence information has been cancelled or that the notification of overturn occurrence information that was notified of has been cancelled. Further, by recognizing a change in the light radiation state or the sound generation state, a third party present in the area around the leaning vehicle can also know that preparation for notifying of overturn occurrence information has been cancelled or that the notification of overturn occurrence information that was notified of has been cancelled.

(3) The overturn-notification-rider-informing-device according to (1), wherein:

the overturn-notification-rider-informing-actuation-section actuates two or more components among the front light, the indicators, the back light, the meter panel and the image display section.

According to the overturn-notification-rider-informing-device of (3), the probability of the rider knowing the overturn notification state increases. More specifically, the overturn-notification-rider-informing-actuation-section actuates two or more components among the front light, the indicators, the back light, the meter panel and the image display section. In this case, there is a high probability that the leaning vehicle that is in an overturned state will radiate light or generate sound in two or more horizontal directions. Therefore, there is a higher probability that light radiated in a horizontal direction or sound generated in a horizontal direction will reach the rider. Hence, there is a higher probability that the rider can know the overturn notification state based on light that is radiated in a horizontal direction or sound that is generated in a horizontal direction. There is also a higher probability that a third party present in the area around the leaning vehicle can know the overturn notification state based on light that is radiated in a horizontal direction or sound that is generated in a horizontal direction.

(4) The overturn-notification-rider-informing-device according to (1), wherein:

in a case where the front light, the meter panel or the image display section is unlit at a time when, or immediately before, the leaning vehicle changes from a travelling state to an overturned state, the overturn-notification-rider-informing-actuation-section informs the rider of the overturn notification state by causing the front light, the meter panel or the image display section to light up or to flash after the leaning vehicle changes from the travelling state to the overturned state;

or in a case where the front light, the meter panel or the image display section is lit at a time when, or immediately before, the leaning vehicle changes from a travelling state to an overturned state, the overturn-notification-rider-informing-actuation-section informs the rider of the overturn notification state by causing the front light, the meter panel or the image display section to flash after the leaning vehicle changes from the travelling state to the overturned state.

According to the overturn-notification-rider-informing-device of (4), the rider can know the overturn notification state by way of a change in the light radiation state of the front light, the meter panel or the image display section. Further, a third party present in the area around the leaning vehicle can also know the overturn notification state by way of a change in the light radiation state of the front light, the meter panel or the image display section.

(5) The overturn-notification-rider-informing-device according to (1), wherein:

the front light includes a high-beam state in which a travelling headlight lights up, and a low-beam state in which a passing headlight lights up; and in a case where the front light is lit in the high-beam state or the low-beam state at a time when, or immediately before, the leaning vehicle changes from a travelling state to an overturned state, the overturn-notification-rider-informing-actuation-section informs the rider of the overturn notification state by alternately switching between the high-beam state and the low-beam state of the front light after the leaning vehicle changes from the travelling state to the overturned state.

According to the overturn-notification-rider-informing-device of (5), the rider can know the overturn notification state by way of a change in the light radiation state of the front light. Further, a third party present in the area around the leaning vehicle can also know the overturn notification state by way of a change in the light radiation state of the front light.

(6) The overturn-notification-rider-informing-device according to (1), wherein:

the indicators include a right indicator and a left indicator; and in a case where the right indicator and the left indicator are unlit at a time when, or immediately before, the leaning vehicle changes from a travelling state to an overturned state, the overturn-notification-rider-informing-actuation-section informs the rider of the overturn notification state by causing the right indicator and/or the left indicator to light up after the leaning vehicle changes from the travelling state to the overturned state, or by causing the right indicator and the left indicator to flash alternately after the leaning vehicle changes from the travelling state to the overturned state, or by causing the right indicator and the left indicator to flash simultaneously after the leaning vehicle changes from the travelling state to the overturned state, or by causing the right indicator or the left indicator to flash after the leaning vehicle changes from the travelling state to the overturned state.

According to the overturn-notification-rider-informing-device of (6), the rider can know the overturn notification state by way of a change in the light radiation state of the indicators. Further, a third party present in the area around the leaning vehicle can also know the overturn notification state by way of a change in the light radiation state of the indicators.

(7) The overturn-notification-rider-informing-device according to (1), wherein:

the indicators include a right indicator and a left indicator;

the right indicator and the left indicator are caused to simultaneously flash according to a first cycle when used as emergency stop lights; and in a case where the right indicator and the left indicator are simultaneously flashing according to the first cycle at a time when, or immediately before, the leaning vehicle changes from a travelling state to an overturned state, the overturn-notification-rider-informing-actuation-section informs the rider of the overturn notification state by causing the right indicator and the left indicator to simultaneously flash according to a second cycle that is different from the first cycle after the leaning vehicle changes from the travelling state to the overturned state.

According to the overturn-notification-rider-informing-device of (7), the rider can know the overturn notification state by way of a change in the light radiation state of the indicators. Further, a third party present in the area around the leaning vehicle can also know the overturn notification state by way of a change in the light radiation state of the indicators.

(8) The overturn-notification-rider-informing-device according to (1), wherein:

the indicators include a right indicator and a left indicator; and in a case where the right indicator or the left indicator is flashing at a time when, or immediately before, the leaning vehicle changes from a travelling state to an overturned state, the overturn-notification-rider-informing-actuation-section informs the rider of the overturn notification state by causing the right indicator and the left indicator to light up after the leaning vehicle changes from the travelling state to the overturned state, or by causing the right indicator and the left indicator to flash alternately after the leaning vehicle changes from the travelling state to the overturned state, or by causing the right indicator and the left indicator to flash simultaneously after the leaning vehicle changes from the travelling state to the overturned state.

According to the overturn-notification-rider-informing-device of (8), the rider can know the overturn notification state by way of a change in the light radiation state of the indicators. Further, a third party present in the area around the leaning vehicle can also know the overturn notification state by way of a change in the light radiation state of the indicators.

(9) The overturn-notification-rider-informing-device according to (1), wherein:

the indicators include a right indicator and a left indicator; and in a case where the right indicator and the left indicator are flashing simultaneously at a time when, or immediately before, the leaning vehicle changes from a travelling state to an overturned state, the overturn-notification-rider-informing-actuation-section informs the rider of the overturn notification state by causing the right indicator and/or the left indicator to light up after the leaning vehicle changes from the travelling state to the overturned state, or by causing the right indicator and the left indicator to flash alternately after the leaning vehicle changes from the travelling state to the overturned state.

According to the overturn-notification-rider-informing-device of (9), the rider can know the overturn notification state by way of a change in the light radiation state of the indicators. Further, a third party present in the area around the leaning vehicle can also know the overturn notification state by way of a change in the light radiation state of the indicators.

(10) The overturn-notification-rider-informing-device according to (1), wherein:

in a case where the back light is unlit at a time when, or immediately before, the leaning vehicle changes from a travelling state to an overturned state, the overturn-notification-rider-informing-actuation-section informs the rider of the overturn notification state by causing the back light to light up or to flash after the leaning vehicle changes from the travelling state to the overturned state, in a case where the back light is lit at a time when, or immediately before, the leaning vehicle changes from a travelling state to an overturned state, the overturn-notification-rider-informing-actuation-section informs the rider of the overturn notification state by causing the back light to flash after the leaning vehicle changes from the travelling state to the overturned state, in a case where the back light is flashing at a time when, or immediately before, the leaning vehicle changes from a travelling state to an overturned state, the overturn-notification-rider-informing-actuation-section informs the rider of the overturn notification state by causing the back light to light up after the leaning vehicle changes from the travelling state to the overturned state, or in a case where the back light is flashing according to a third cycle at a time when, or immediately before, the leaning vehicle changes from a travelling state to an overturned state, the overturn-notification-rider-informing-actuation-section informs the rider of the overturn notification state by causing the back light to flash according to a fourth cycle that is different from the third cycle after the leaning vehicle changes from the travelling state to the overturned state.

According to the overturn-notification-rider-informing-device of (10), the rider can know the overturn notification state by way of a change in the light radiation state of the back light. Further, a third party present in the area around the leaning vehicle can also know the overturn notification state by way of a change in the light radiation state of the back light.

(11) The overturn-notification-rider-informing-device according to (1), wherein:

in a case where the horn or the buzzer is not generating sound at a time when, or immediately before, the leaning vehicle changes from a travelling state to an overturned state, the overturn-notification-rider-informing-actuation-section informs the rider of the overturn notification state by causing the horn or the buzzer to intermittently or continuously generate sound after the leaning vehicle changes from the travelling state to the overturned state;

or in a case where the horn is continuously generating sound at a time when, or immediately before, the leaning vehicle changes from a travelling state to an overturned state, the overturn-notification-rider-informing-actuation-section informs the rider of the overturn notification state by causing the horn to intermittently generate sound after the leaning vehicle changes from the travelling state to the overturned state.

According to the overturn-notification-rider-informing-device of (11), the rider can know the overturn notification state by way of a change in the sound generation state of the horn or the buzzer. Further, a third party present in the area around the leaning vehicle can also know the overturn notification state by way of a change in the sound generation state of the horn or the buzzer.

(12) A leaning vehicle, including:

an overturn-notification-rider-informing-device according to (1).

The leaning vehicle of (12) can inform a rider who is separated from the leaning vehicle that preparation is underway to notify of overturn occurrence information, or that notification of overturn occurrence information has been performed. Further, the leaning vehicle of (12) can also inform a third party present in the area around the leaning vehicle that preparation is underway to notify of overturn occurrence information, or that notification of overturn occurrence information has been performed.

The aforementioned objects and other objects, features, aspects and advantages of the present invention will become more apparent from the following detailed description of embodiments of the invention that are described in association with the attached drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the invention, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for the purpose of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

Advantageous Effects of Invention

According to the present invention, a leaning vehicle can, by a different method from a conventional method, inform a rider who is separated from the leaning vehicle that preparation is underway to notify of the occurrence of overturning to an outside party or that the occurrence of overturning has been notified of to an outside party.

BRIEF DESCRIPTION OF THE DRAWINGS

FIG. 6 is a functional block diagram of a leaning-vehicle-overturn-notification-system 1a.

FIG. 7 is a functional block diagram of a leaning-vehicle-overturn-notification-system 1b.

DETAILED DESCRIPTION

First Embodiment

[Configuration of Leaning-Vehicle-Overturn-Notification-System]

Figure 1:
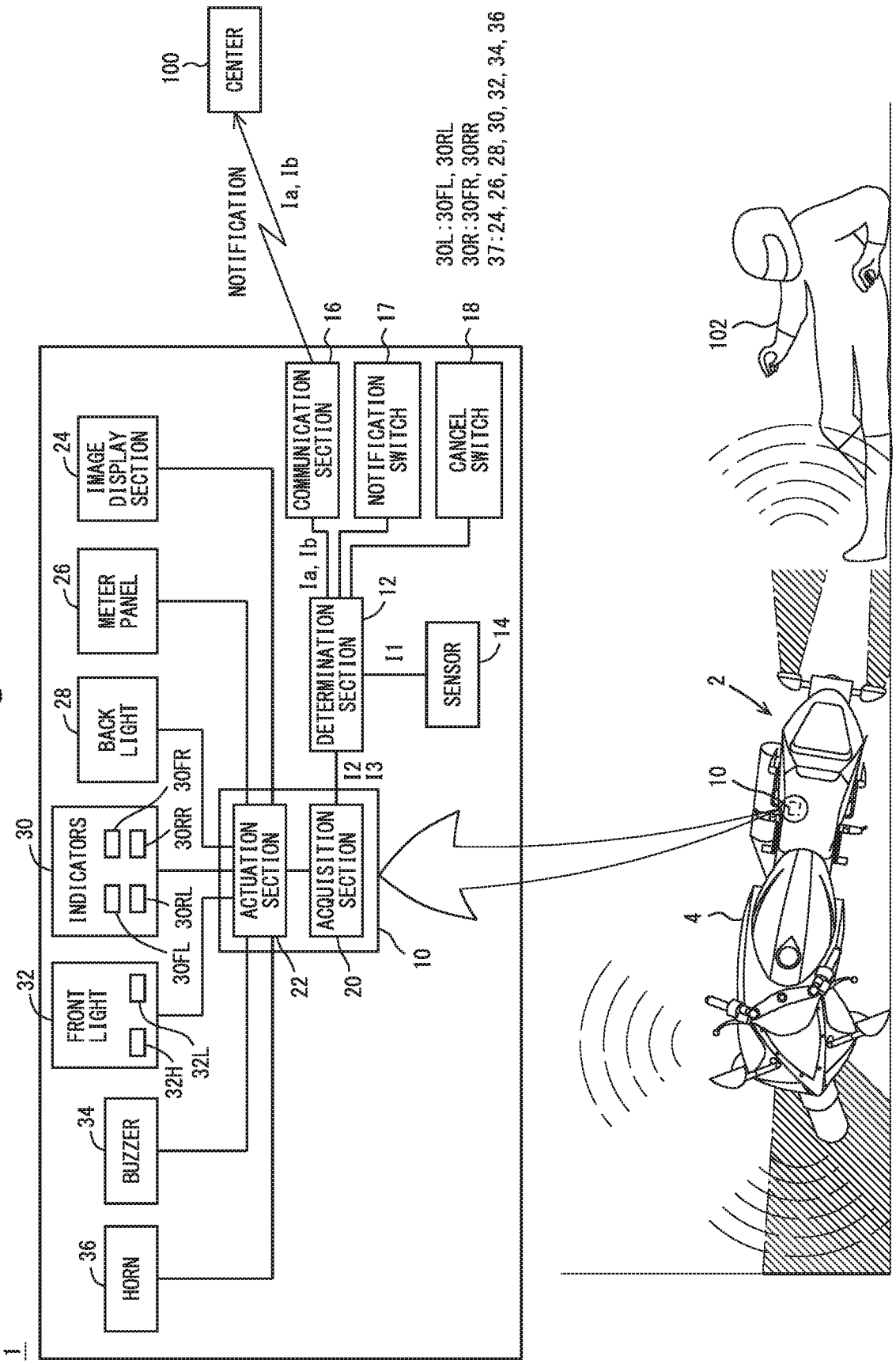
FIG. 1 is a functional block diagram of a leaning-vehicle-overturn-notification-system 1.
Figure 2:
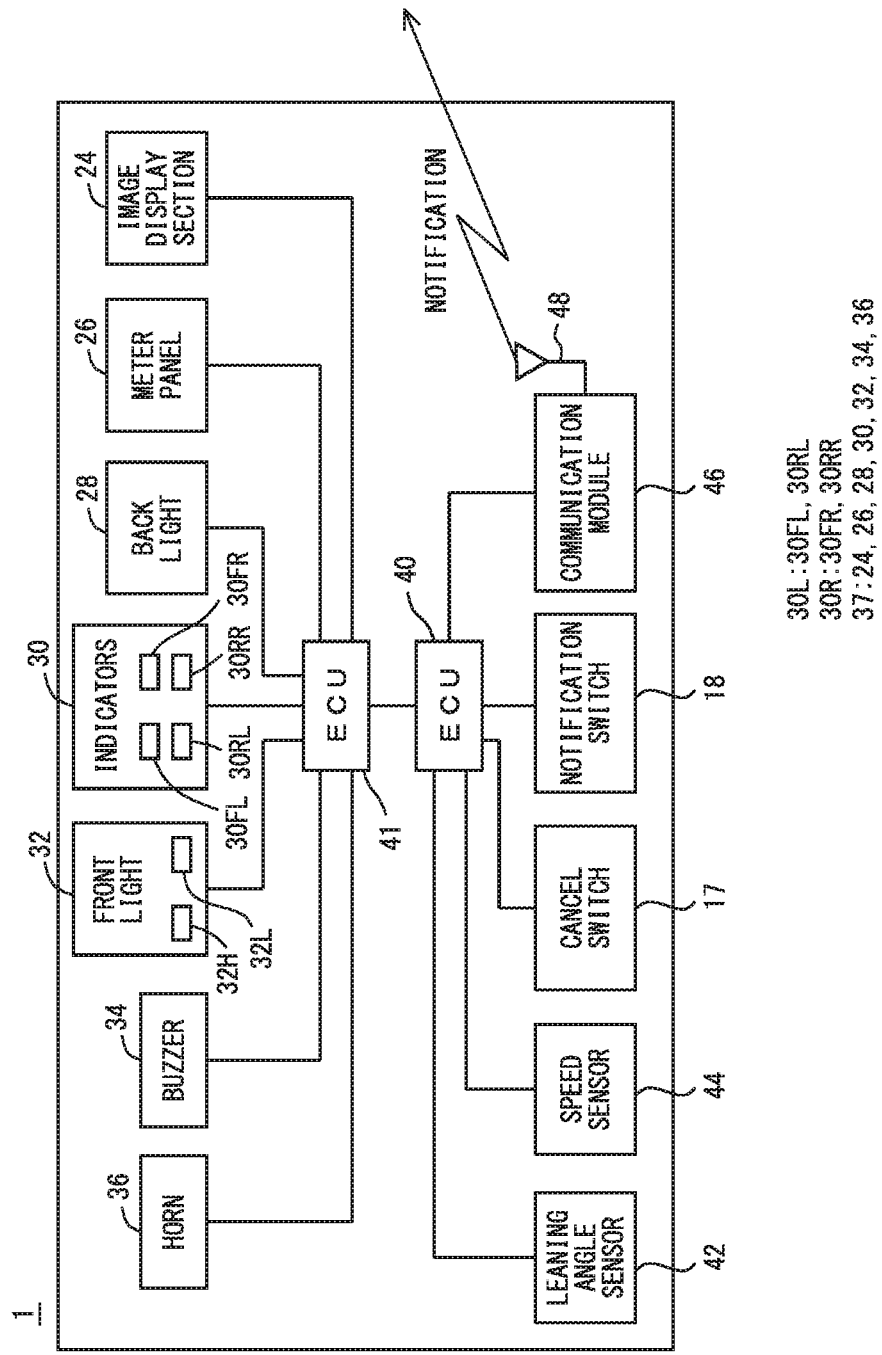
FIG. 2 is a block diagram illustrating the hardware configuration of the leaning-vehicle-overturn-notification-system 1.
Figure 3:
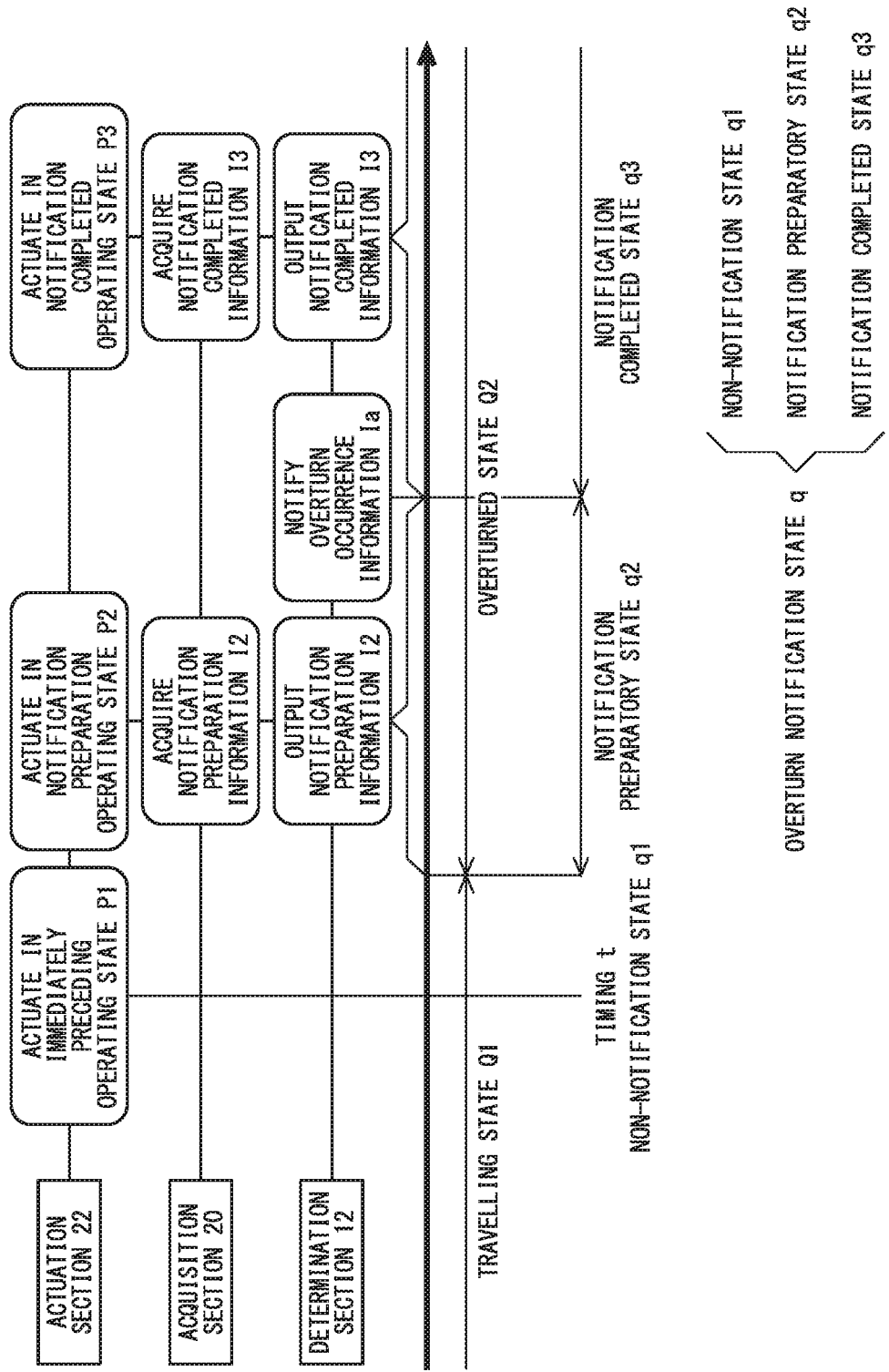
FIG. 3 is a state transition diagram of the leaning-vehicle-overturn-notification-system 1.

Hereunder, the configuration of a leaning-vehicle-overturn-notification-system that includes an overturn-notification-rider-informing-device according to a first embodiment is described while referring to the attached drawings. FIG. 1 is a functional block diagram of a leaning-vehicle-overturn-notification-system 1. FIG. 2 is a block diagram illustrating the hardware configuration of the leaning-vehicle-overturn-notification-system 1. FIG. 3 is a state transition diagram of the leaning-vehicle-overturn-notification-system 1.

The leaning-vehicle-overturn-notification-system 1 is a system that notifies overturn occurrence information Ia indicating that a motorcycle 2 changed from a travelling state to an overturned state to outside of the motorcycle 2 by radio communication. The term "outside of the motorcycle 2" is not particularly limited, and for example, refers to a center 100. The center 100 dispatches assistance to a rider 102 of the motorcycle 2 based on the overturn occurrence information Ia. In addition, the leaning-vehicle-overturn-notification-system 1 utilizes light or sound to inform the rider 102 of an overturn notification state q (see FIG. 3) that indicates the status of notification of the overturn occurrence information Ia. The overturn notification state q may be a non-notification state q1, a notification preparatory state q2, or a notification completed state q3 (see FIG. 2) that are described later.

The motorcycle 2 is a leaning vehicle that leans into turns. The leaning vehicle is not particularly limited, and is, for example, a straddled vehicle such as a motorcycle or a motor tricycle. Hereinafter, the term "frontward direction" refers to the direction of travel of the motorcycle 2 in an upright state. The term "backward direction" refers to the opposite direction to the direction of travel of the motorcycle 2 in an upright state. The terms "rightward direction" and "leftward direction" refer to the rightward direction and the leftward direction, respectively, when taking a rider 102 who straddles the motorcycle 2 in an upright state as a reference. The terms "upward direction" and "downward direction" refer to the upward direction and the downward direction, respectively, when taking the rider 102 who straddles the motorcycle 2 in an upright state as a reference.

The motorcycle 2 includes the leaning-vehicle-overturn-notification-system 1 and a vehicle body 4. The leaning-vehicle-overturn-notification-system 1 includes an overturn-notification-rider-informing-device 10, a determination section 12, a sensor 14, a communication section 16, a notification switch 17, a cancel switch 18, an image display section 24, a meter panel 26, a back light 28, indicators 30, a front light 32, a buzzer 34 and a horn 36.

The vehicle body 4 leans to the left when the motorcycle 2 is turning left and leans to the right when the motorcycle 2 is turning right. The vehicle body 4 includes the principal components of the motorcycle 2 such as a handle, a frame, an engine, a transmission, a front fork, a swing arm, a front suspension, a rear suspension, a front wheel, a front tire, a rear wheel, a rear tire, a front brake and a rear brake. Further, the vehicle body 4 holds the overturn-notification-rider-informing-device 10, the determination section 12, the sensor 14, the communication section 16, the notification switch 17, the cancel switch 18, the image display section 24, the meter panel 26, the back light 28, the indicators 30, the front light 32, the buzzer 34 and the horn 36.

The meter panel 26 includes a speedometer, a tachometer, a fuel gauge, a water temperature gauge and the like. The meter panel 26 is provided, for example, in front of or behind the handle of the motorcycle 2. The meter panel 26 may include meters that have a needle and a dial, or may include meters that are displayed on a liquid crystal panel or an organic EL panel. Further, the meter panel 26 may include a meter having a needle and a dial and meters that are displayed on a liquid crystal panel and an organic EL panel. In a case where the meter panel 26 includes a meter having a needle and a dial, the meter panel 26 includes a meter bulb. The meter bulb is an illumination light that is provided in the meter panel 26 in order to improve the visibility of the meter panel 26 in dark places. In a case where the meter panel 26 includes a meter that is displayed on a liquid crystal panel or an organic EL panel, the meter panel 26 itself can emit light. Hereinafter, the meter panel 26 is described on the assumption that the meter panel 26 includes meters which are displayed on a liquid crystal panel.

The image display section 24 displays a screen image of a navigation system. The image display section 24, for example, is provided in front of the handle of the motorcycle 2. The image display section is not particularly limited, and is a liquid crystal panel, an organic EL panel or the like. Further, a screen image that is displayed on the image display section 24 is not particularly limited, and may be a screen image that shows a state of the motorcycle 2 or the like.

The back light 28 is a lighting device that radiates light in the rearward direction of the motorcycle 2. The back light 28 is a tail light and a brake light. Therefore, the back light 28 is provided in the vicinity of the back end of the motorcycle 2.

The indicators 30 are lighting devices that flash in order to indicate the direction of travel of the motorcycle 2. The indicators 30 include, in the vicinity of the front end of the motorcycle 2, a right-front indicator 30FR and a left-front indicator 30FL that are provided to the right from and to the left from a center line of the motorcycle 2, respectively. The indicators 30 also include, in the vicinity of the back end of the motorcycle 2, a right-rear indicator 30RR and a left-rear indicator 30RL that are provided to the right from and to the left from the center line of the motorcycle 2, respectively. Hereinafter, the right-front indicator 30FR and the right-rear indicator 30RR are referred to collectively as "right indicators 30R". Further, the left-front indicator 30FL and the left-rear indicator 30RL are referred to collectively as "left indicators 30L". The term "center line of the motorcycle 2" refers to a line that passes through the center in the left-right direction of the leaning vehicle when the motorcycle 2 that is in an upright state is viewed from the frontward direction, the backward direction, the upward direction or the downward direction.

When the motorcycle 2 turns to the right, the rider 102 operates an indicator switch (not illustrated in the drawings) to cause the right indicators 30R to flash. When the motorcycle 2 turns to the left, the rider 102 operates an indicator switch (not illustrated in the drawing) to cause the left indicators 30L to flash. Further, when the rider 102 operates a hazard light switch (not illustrated in the drawing), the right indicators 30R and left indicators 30L simultaneously flash, and in this way the indicators 30 are also used as emergency stop lights (hazard lights). When being used as emergency stop lights, the right indicators 30R and the left indicators 30L flash according to a cycle T10.

The front light 32 is a lighting device that radiates light in the frontward direction of the motorcycle 2. The front light 32 includes a high-beam light source 32H and a low-beam light source 32L. With respect to the frontward direction of the motorcycle 2, the high-beam light source 32H radiates light in a horizontal direction or a direction that is further upward than the horizontal direction. The high-beam light source 32H is a travelling headlight. Hereinafter, a state in which the high-beam light source 32H is radiating light is referred to as a "high-beam state". With respect to the frontward direction of the motorcycle 2, the low-beam light source 32L radiates light in a horizontal direction or a direction that is further downward than the horizontal direction. The low-beam light source 32L is a passing headlight. Hereinafter, a state in which the low-beam light source 32L is radiating light is referred to as a "low-beam state".

The buzzer 34 is a sound source that is provided in a keyless system or a smart key system. The buzzer 34 generates a buzzer sound upon a key or a smart key of the motorcycle 2 being operated.

The horn 36 is a safety apparatus for informing other traffic by sound that the motorcycle 2 is approaching. The horn 36 generates a sound upon the rider 102 operating a horn button of the motorcycle 2.

The image display section 24, the meter panel 26, the back light 28, the front light 32, the buzzer 34 and the horn 36 described above are disposed on the center line of the vehicle body 4, and are not disposed on a side face of the vehicle body 4.

The sensor 14 acquires determination base information I1 that is used for making an overturn determination and a notification determination at the determination section 12 as described later. The overturn determination is a determination as to whether or not the motorcycle 2 changed from a travelling state Q1 (see FIG. 3) to an overturned state Q2 (see FIG. 3). The notification determination is a determination that, in a case where the motorcycle 2 changed from the travelling state Q1 to the overturned state Q2, determines whether or not it is necessary to notify of the overturn occurrence information Ia to the center 100 by radio communication. The sensor 14 is not particularly limited, and for example is a leaning determination sensor 42 and a speed sensor 44 (see FIG. 2). The leaning determination sensor 42 is a sensor that determines whether or not an angle (leaning angle) that is formed by the center line of the motorcycle 2 and the vertical direction when the motorcycle 2 is viewed from the frontward direction is greater than a prescribed value. If the leaning angle is greater than the prescribed value, the leaning determination sensor 42 outputs a signal "1". If the leaning angle is less than the prescribed value, the leaning determination sensor 42 outputs a signal "0". The leaning angle being greater than the prescribed value is a necessary condition for determining that the motorcycle 2 is in the overturned state Q2. The prescribed value is a value that is defined according to the respective methods for determining the occurrence of overturning which are described later, and therefore is a value that differs for each overturn determination method. Note that, the leaning determination sensor 42 may measure the leaning angle, and output the measured leaning angle. The speed sensor 44 measures the speed of the motorcycle 2. Hence, the determination base information I1 is information regarding the leaning angle and the speed of the motorcycle 2. Note that, the sensor 14 may include a sensor other than the leaning determination sensor 42 and the speed sensor 44. A sensor other than the leaning determination sensor 42 and the speed sensor 44 is not particularly limited, and for example is an acceleration sensor. The acceleration sensor measures the acceleration of the motorcycle 2. In such case, information regarding the acceleration is also included in the determination base information I1.

The determination section 12 determines whether or not the motorcycle 2 changed from the travelling state Q1 to the overturned state Q2, based on the determination base information I1 that is output thereto from the sensor 14 (overturn determination). In addition, based on the determination base information I1 that is output thereto from the sensor 14, the determination section 12 determines whether or not it is necessary to notify of the overturn occurrence information Ia to the center 100 by radio communication (notification determination). Even when the motorcycle 2 changed from the travelling state Q1 to the overturned state Q2, in some cases, for reasons such as the impact of overturning being small, it is not necessary for the leaning-vehicle-overturn-notification-system 1 to notify of the overturn occurrence information Ia to the center 100. Therefore, the determination section 12 performs the notification determination after the overturn determination. To perform the notification determination, the determination section 12, for example, determines the size of the impact of overturning based on the speed of the motorcycle 2 that the speed sensor 44 measured. If the impact of overturning is relatively large, the determination section 12 determines that it is necessary to notify of the overturn occurrence information Ia to outside of the motorcycle 2. If the impact of overturning is relatively small, the determination section 12 determines that it is not necessary to notify of the overturn occurrence information Ia to outside of the motorcycle 2. Various determination methods that are already known can be applied as the methods used to perform the overturn determination and the notification determination. Further, novel determination methods that are not publicly known may be applied as the methods used to perform the overturn determination and the notification determination. A definition of the travelling state Q1 and a definition of the overturned state Q2 are not particularly limited, and the definitions differ depending on the method for determining the occurrence of overturning. Further, the conditions for determining that notification of the overturn occurrence information Ia is necessary are also not particularly limited, and the conditions differ depending on the notification determination method.

In addition, in a case where the determination section 12 determines that the motorcycle 2 changed from the travelling state Q1 to the overturned state Q2 and also determines that notification of the overturn occurrence information Ia is necessary, the determination section 12 carries out preparation for notifying of the overturn occurrence information Ia to the center 100. Hereunder, a fact that the determination section 12 determines that the motorcycle 2 changed from the travelling state Q1 to the overturned state Q2 is referred to as an "overturn change determination". Further, a fact that the determination section 12 determines that notification of the overturn occurrence information Ia is necessary is referred to as a "notification necessary determination". In a case where the determination section 12 made an overturn change determination and a notification necessary determination, the determination section 12 waits for a predetermined time period Ta (for example, 30 seconds) from the time of making the notification necessary determination before outputting the overturn occurrence information Ia to the communication section 16 that is described later. An overturn notification state q in which the determination section 12 is waiting before outputting the overturn occurrence information Ia is referred to as "notification preparatory state q2" (see FIG. 3). In the notification preparatory state q2, the determination section 12 continuously outputs notification preparation information I2 to an acquisition section 20 that is described later. The notification preparation information I2 is information indicating that the leaning-vehicle-overturn-notification-system 1 is preparing to notify of the overturn occurrence information Ia to the center 100.

On the other hand, when the predetermined time period Ta passes after making the notification necessary determination, the determination section 12 outputs the overturn occurrence information Ia to the communication section 16 that is described later. When the communication section 16 receives the overturn occurrence information Ia that was output from the determination section 12, the communication section 16 transmits the overturn occurrence information Ia to the center 100. More specifically, the communication section 16 includes a communication module 46 and an antenna 48 (see FIG. 2). The communication module 46, for example, is a communication module that is used for radio communication as typified by a second-generation radio communication system, a third-generation radio communication system, a fourth-generation radio communication system or LTE (Long Term Evolution) or the like. However, since the communication speed required for the communication module 46 is comparatively slow, it is considered that the communication module 46 is a communication module according to a second-generation radio communication system or a third-generation radio communication system. The communication module 46 converts the overturn occurrence information Ia that has been output thereto from the determination section 12 to a high-frequency signal having a frequency that is suitable for radio communication, and outputs the converted signal to the antenna 48. The antenna 48 transmits the high-frequency signal that was output thereto from the communication module 46 into the atmosphere as electromagnetic waves. By this means, the leaning-vehicle-overturn-notification-system 1 notifies of the overturn occurrence information Ia to the center 100. Hereunder, the overturn notification state q in which the overturn occurrence information Ia has been notified of is referred to as "notification completed state q3" (see FIG. 3). In the notification completed state q3, the determination section 12 continues to output notification completed information I3 to the acquisition section 20 that is described later. The notification completed information I3 is information indicating that the leaning-vehicle-overturn-notification-system 1 notified the overturn occurrence information Ia to the center 100. The determination section 12 is, for example, an ECU (electronic control unit) 40 in which an IC (semiconductor integrated circuit) and electronic parts or the like are mounted on a circuit board (see FIG. 2).

The notification switch 17 is a switch for causing the leaning-vehicle-overturn-notification-system 1 to notify of the overturn occurrence information Ia to the center 100 upon the notification switch 17 being operated by the rider 102 or a third party. When the notification switch 17 is operated by the rider 102 or a third party, even if the determination section 12 has not made an overturn change determination and a notification necessary determination, the leaning-vehicle-overturn-notification-system 1 notifies of the overturn occurrence information Ia to the center 100.

The cancel switch 18 is a switch for cancelling the preparation by the leaning-vehicle-overturn-notification-system 1 for notifying of the overturn occurrence information Ia to the center 100, when the cancel switch 18 is operated by the rider 102 or a third party. Specifically, even when in the notification preparatory state q2, there are times when the rider 102 does not want the leaning-vehicle-overturn-notification-system 1 to notify of the overturn occurrence information Ia to the center 100. Therefore, before outputting the overturn occurrence information Ia to the communication section 16, the determination section 12 waits for the predetermined time period Ta after making a notification necessary determination. If the cancel switch 18 is operated by the rider 102 or a third party while the determination section 12 is waiting to output the overturn occurrence information Ia, the determination section 12 does not output the overturn occurrence information Ia to the communication section 16. That is, the leaning-vehicle-overturn-notification-system 1 cancels the preparation for notifying of the overturn occurrence information Ia. In addition, the determination section 12 stops output of the notification preparation information I2 to the acquisition section 20.

The cancel switch 18 is also a switch for cancelling the notification of the overturn occurrence information Ia in a case where the leaning-vehicle-overturn-notification-system 1 has notified the overturn occurrence information Ia to the center 100. Specifically, even in the notification completed state q3, in some cases the rider 102 wants to cancel the notification of the overturn occurrence information Ia that was notified of to the center 100. Therefore, after the overturn occurrence information Ia has been notified of to the center 100, if the cancel switch 18 is operated by the rider 102 or a third party, the determination section 12 sends notification cancellation information Ib to the center 100 through the communication section 16. That is, the leaning-vehicle-overturn-notification-system 1 cancels the notification of the overturn occurrence information Ia that was notified of. In addition, the determination section 12 stops output of the notification completed information I3 to the acquisition section 20.

The overturn-notification-rider-informing-device 10 includes a leaning-vehicle-overturn-notification-information-acquisition-section 20 (hereinafter, referred to simply as "acquisition section 20") and an overturn-notification-rider-informing-actuation-section 22 (hereinafter, referred to simply as "actuation section 22"). The acquisition section 20 acquires the notification preparation information I2 or the notification completed information I3 from the determination section 12. The actuation section 22 actuates at least one of the image display section 24, the meter panel 26, the back light 28, the indicators 30, the front light 32, the buzzer 34 or the horn 36 in an operating state that is different from an operating state at a timing t (see FIG. 3), based on the notification preparation information I2 or the notification completed information I3 that the acquisition section 20 acquired. Hereinafter, the image display section 24, the meter panel 26, the back light 28, indicators 30, the front light 32, the buzzer 34 and the horn 36 are referred to collectively as "light/sound generation sections 37". The timing t is immediately before the motorcycle 2 changes from the travelling state Q1 to the overturned state Q2. The overturn notification state q in the travelling state Q1 (that is, at the timing t) is the non-notification state q1 (see FIG. 3). The non-notification state q1 is a state in which the leaning-vehicle-overturn-notification-system 1 is not preparing for notification of the overturn occurrence information Ia and has not notified of the overturn occurrence information Ia. The term "immediately before the motorcycle 2 changes from the travelling state Q1 to the overturned state Q2" is not particularly limited, and for example is any moment in a period from several seconds before the time of an overturn change determination until the time of the overturn change determination.

More specifically, in the non-notification state q1, the acquisition section 20 does not acquire the notification preparation information I2 and the notification completed information I3. In the notification preparatory state q2, the acquisition section 20 acquires the notification preparation information I2. In the notification completed state q3, the acquisition section 20 acquires the notification completed information I3. Therefore, based on whether or not the notification preparation information I2 and the notification completed information I3 are acquired, the acquisition section 20 can determine whether the overturn notification state q is the non-notification state q1, the notification preparatory state q2 or the notification completed state q3. The actuation section 22 actuates at least one of the light/sound generation sections 37 to cause the relevant light/sound generation section(s) 37 to radiate light or generate sound in a horizontal direction from the motorcycle 2 in an overturned state, in an operating state that differs between the non-notification state q1, the notification preparatory state q2 and the notification completed state q3. Therefore, the light radiation states as well as the sound generation states are different from each other, respectively, between the non-notification state q1, the notification preparatory state q2 and the notification completed state q3. Thus, the actuation section 22 notifies the rider 102 of the overturn notification state q that shows the status of notification of the overturn occurrence information Ia, by changing the light radiation state or the sound generation state according to the status of notification of the overturn occurrence information Ia. The term "cause to radiate light in a horizontal direction" means causing the relevant light/sound generation section 37 to generate light that travels in a horizontal direction. However, the light/sound generation sections 37 may radiate light in a direction other than a horizontal direction. Further, the term "cause to generate sound in a horizontal direction" means causing the relevant light/sound generation section 37 to generate sound that travels in a horizontal direction. However, as illustrated in FIG. 1, the light/sound generation sections 37 may generate sound in a direction other than the horizontal direction. Further, the term "horizontal direction" typically refers to a direction that is perpendicular to the direction in which the force of gravity acts. However, in this specification the term "horizontal direction" also includes a direction that inclines relative to a direction that is perpendicular to the direction in which the force of gravity acts. This is because there is a possibility that the motorcycle 2 will overturn on a slope. In this specification, the range of an angle (that is, an angle of elevation) formed by the "horizontal direction" and a plane perpendicular to the direction in which the force of gravity acts is −45° or more to not more than 45°.

Hereinafter, the operating state of each light/sound generation section 37 at the time t (the non-notification state q1) is referred to as "immediately preceding operating state P1" (see FIG. 3). The operating state of each light/sound generation section 37 in the notification preparatory state q2 is referred to as "notification preparation operating state P2" (see FIG. 3). The operating state of each light/sound generation section 37 in the notification completed state q3 is referred to as "notification completed operating state P3" (see FIG. 3). The light radiation states as well as the sound generation states of the respective light/sound generation sections 37 are different from each other between the immediately preceding operating state P1, the notification preparation operating state P2 and the notification completed operating state P3. Operating state examples 1 to 42 with respect to the immediately preceding operating state P1, the notification preparation operating state P2 and the notification completed operating state P3 are shown in Table 1 and Table 2.

TABLE 1

| Operating State Example | | Immediately Preceding Operating State P1 | Notification Preparation Operating State P2 | Notification Completed Operating State P3 |
| --- | --- | --- | --- | --- |
| 1 | Image Display Section 24 | Unlit | Lit | Flashing |
| 2 | Image Display Section 24 | Unlit | Flashing | Lit |
| 3 | Image Display Section 24 | Lit | Flashing According to Cycle T1 | Flashing According to Cycle T2 |
| 4 | Image Display Section 24 | Lit in First Color | Lit in Second Color | Lit in Third Color |
| 5 | Meter Panel 26 | Unlit | Lit | Flashing |
| 6 | Meter Panel 26 | Unlit | Flashing | Lit |
| 7 | Meter Panel 26 | Lit | Flashing According to Cycle T3 | Flashing According to Cycle T4 |
| 8 | Meter Panel 26 | Lit in Fourth Color | Lit in Fifth Color | Lit in Sixth Color |
| 9 | Back Light 28 | Unlit | Lit | Flashing |
| 10 | Back Light 28 | Unlit | Flashing | Lit |
| 11 | Back Light 28 | Lit | Flashing According to Cycle T5 | Flashing According to Cycle T6 |
| 12 | Back Light 28 | Flashing According to Cycle T7 | Lit | Flashing According to Cycle T8 |
| 13 | Back Light 28 | Flashing According to Cycle T7 | Flashing According to Cycle T9 | Lit |

TABLE 1-continued

| Operating State Example | | Immediately Preceding Operating State P1 | Notification Preparation Operating State P2 | Notification Completed Operating State P3 |
|---|---|---|---|---|
| 14 | Back Light 28 | Flashing According to Cycle T7 | Flashing According to Cycle T9 | Flashing According to Cycle T8 |
| 15 | Indicators 30 | All Unlit | Right Indicators and Left Indicators Flash Alternately | Right Indicators and Left Indicators Flash Simultaneously |
| 16 | Indicators 30 | All Unlit | Right Indicators and Left Indicators Flash Alternately | Right Indicators or Left Indicators Flash |
| 17 | Indicators 30 | All Unlit | Right Indicators and Left Indicators Flash Alternately | Right Indicators and/or Left Indicators are Light Up |
| 18 | Indicators 30 | All Unlit | Right Indicators and Left Indicators Flash Simultaneously | Right Indicators or Left Indicators Flash |
| 19 | Indicators 30 | All Unlit | Right Indicators and Left Indicators Flash Simultaneously | Right Indicators and Left Indicators Flash Alternately |
| 20 | Indicators 30 | All Unlit | Right Indicators and Left Indicators Flash Simultaneously | Right Indicators and/or Left Indicators are Light Up |
| 21 | Indicators 30 | All Unlit | Right Indicators or Left Indicators Flash | Right Indicators and Left Indicators Flash Alternately |

TABLE 2

| Operating State Example | | Immediately Preceding Operating State P1 | Notification Preparation Operating State P2 | Notification Completed Operating State P3 |
|---|---|---|---|---|
| 22 | Indicators 30 | All Unlit | Right Indicators or Left Indicators Flash | Right Indicators and Left Indicators Flash Simultaneously |
| 23 | Indicators 30 | All Unlit | Right Indicators or Left Indicators Flash | Right Indicators and/or Left Indicators are Light Up |
| 24 | Indicators 30 | All Unlit | Right Indicators and/or Left Indicators are Light Up | Right Indicators and Left Indicators Flash Alternately |
| 25 | Indicators 30 | All Unlit | Right Indicators and/or Left Indicators are Light Up | Right Indicators and Left Indicators Flash Simultaneously |
| 26 | Indicators 30 | All Unlit | Right Indicators and/or Left Indicators are Light Up | Right Indicators or Left Indicators Flash |
| 27 | Indicators 30 | Flash According to Cycle T10 (Hazard) | Flash According to Cycle T11 | Flash According to Cycle T12 |
| 28 | Indicators 30 | Right Indicators or Left Indicators Flash | Right Indicators and Left Indicators are Lit | Right Indicators and Left Indicators Flash Alternately |
| 29 | Indicators 30 | Right Indicators or Left Indicators Flash | Right Indicators and Left Indicators are Lit | Right Indicators and Left Indicators Flash Simultaneously |
| 30 | Indicators 30 | Right Indicators or Left Indicators Flash | Right Indicators and Left Indicators Flash Alternately | Right Indicators and Left Indicators are Lit |
| 31 | Indicators 30 | Right Indicators or Left Indicators Flash | Right Indicators and Left Indicators Flash Alternately | Right Indicators and Left Indicators Flash Simultaneously |
| 32 | Indicators 30 | Right Indicators or Left Indicators Flash | Right Indicators and Left Indicators Flash Simultaneously | Right Indicators and Left Indicators are Lit |
| 33 | Indicators 30 | Right Indicators or Left Indicators Flash | Right Indicators and Left Indicators Flash Simultaneously | Right Indicators and Left Indicators Flash Alternately |
| 34 | Indicators 30 | Right Indicators and Left Indicators Flash Simultaneously | Right Indicators and/or Left Indicators are Light Up | Right Indicators and Left Indicators Flash Alternately |
| 35 | Indicators 30 | Right Indicators and Left Indicators Flash Simultaneously | Right Indicators and Left Indicators Flash Alternately | Right Indicators and/or Left Indicators are Light Up |
| 36 | Front Light 32 | Unlit | Lit | Flashing |
| 37 | Front Light 32 | Unlit | Flashing | Lit |
| 38 | Front Light 32 | Lit | Flash According to Cycle T13 | Flash According to Cycle T14 |

TABLE 2-continued

| Operating State Example | | Immediately Preceding Operating State P1 | Notification Preparation Operating State P2 | Notification Completed Operating State P3 |
|---|---|---|---|---|
| 39 | Front Light 32 | Low-beam Light Source or High-beam Light Source is Lit | Alternate Switching Between Turning On High-beam Light Source and Turning On Low-beam Light Source According to Cycle T15 | Alternate Switching Between Turning On High-beam Light Source and Turning On Low-beam Light Source According to Cycle T16 |
| 40 | Buzzer 34 | Not Generating Sound | Intermittently Generates Sound | Continuously Generates Sound |
| 41 | Buzzer 34 | Not Generating Sound | Continuously Generates Sound | Intermittently Generates Sound |
| 42 | Horn 36 | Continuously Generates Sound | Intermittently Generates Sound According to Cycle T17 | Intermittently Generates Sound According to Cycle T18 |

A cycle T1 and a cycle T2 are different from each other. However, the cycle T1 may be longer than the cycle T2, or the cycle T1 may be shorter than the cycle T2.

A cycle T3 and a cycle T4 are different from each other. However, the cycle T3 may be longer than the cycle T4, or the cycle T3 may be shorter than the cycle T4.

A cycle T5 and a cycle T6 are different from each other. However, the cycle T5 may be longer than the cycle T6, or the cycle T5 may be shorter than the cycle T6.

A cycle T7, a cycle T8 and a cycle T9 are different from each other.

A cycle T10, a cycle T11 and a cycle T12 are different from each other.

A cycle T13 and a cycle T14 are different from each other. However, the cycle T13 may be longer than the cycle T14, or the cycle T13 may be shorter than the cycle T14.

A cycle T15 and a cycle T16 are different from each other. However, the cycle T15 may be longer than the cycle T16, or the cycle T15 may be shorter than the cycle T16.

A cycle T17 and a cycle T18 are different from each other. However, the cycle T17 may be longer than the cycle T18, or the cycle T17 may be shorter than the cycle T18.

A first color, a second color, and a third color are different from each other.

A fourth color, a fifth color, and a sixth color are different from each other.

In this specification, the term "is lit" means to continue to radiate light without interruption. The term "flash" means a case where a state of radiating light and a state of not radiating light are alternately repeated, and a case where a state of radiating light strongly and a state of radiating light weakly are alternately repeated. Further, the term "continuously generate sound" means to continue to generate sound without interruption. The term "intermittently generate sound" means a case where a state of generating sound and a state of not generating sound are alternately repeated, and a case where a state of generating a large sound and a state of generating a small sound are alternately repeated.

The actuation section 22 can also execute the operating state examples 1 to 42 in combination. In particular, in the notification preparatory state q2 or the notification completed state q3, preferably the actuation section 22 actuates two or more components among the light/sound generation sections 37 in an operating state that is different from the operating state of the relevant components at the time t (immediately preceding operating state P1). In this case, there is a high probability that the motorcycle 2 that is in an overturned state will radiate light or generate sound in two or more horizontal directions. Hereinafter, operating state examples that are combinable will be described. Table 3 is a table that lists combinable operating state examples. In Table 3, "OK" indicates that the listed combination can be combined, while "NG" indicates that the listed combination cannot be combined.

TABLE 3

| | | Operating State Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Operating State Example | 1 | NG | NG | NG | NG | OK | OK | OK | OK | OK | OK | OK | OK | OK | OK | OK | OK |
| | 2 | NG | NG | NG | NG | OK | OK | OK | OK | OK | OK | OK | OK | OK | OK | OK | OK |
| | 3 | NG | NG | NG | NG | OK | OK | OK | OK | OK | OK | OK | OK | OK | OK | OK | OK |
| | 4 | NG | NG | NG | NG | OK | OK | OK | OK | OK | OK | OK | OK | OK | OK | OK | OK |
| | 5 | OK | OK | OK | OK | NG | NG | NG | NG | OK | OK | OK | OK | OK | OK | OK | OK |
| | 6 | OK | OK | OK | OK | NG | NG | NG | NG | OK | OK | OK | OK | OK | OK | OK | OK |
| | 7 | OK | OK | OK | OK | NG | NG | NG | NG | OK | OK | OK | OK | OK | OK | OK | OK |
| | 8 | OK | OK | OK | OK | NG | NG | NG | NG | OK | OK | OK | OK | OK | OK | OK | OK |
| | 9 | OK | OK | OK | OK | OK | OK | OK | OK | NG | NG | NG | NG | NG | NG | OK | OK |
| | 10 | OK | OK | OK | OK | OK | OK | OK | OK | NG | NG | NG | NG | NG | NG | OK | OK |
| | 11 | OK | OK | OK | OK | OK | OK | OK | OK | NG | NG | NG | NG | NG | NG | OK | OK |
| | 12 | OK | OK | OK | OK | OK | OK | OK | OK | NG | NG | NG | NG | NG | NG | OK | OK |
| | 13 | OK | OK | OK | OK | OK | OK | OK | OK | NG | NG | NG | NG | NG | NG | OK | OK |
| | 14 | OK | OK | OK | OK | OK | OK | OK | OK | NG | NG | NG | NG | NG | NG | OK | OK |
| | 15 | OK | OK | OK | OK | OK | OK | OK | OK | OK | OK | OK | OK | OK | OK | NG | NG |
| | 16 | OK | OK | OK | OK | OK | OK | OK | OK | OK | OK | OK | OK | OK | OK | NG | NG |
| | 17 | OK | OK | OK | OK | OK | OK | OK | OK | OK | OK | OK | OK | OK | OK | NG | NG |
| | 18 | OK | OK | OK | OK | OK | OK | OK | OK | OK | OK | OK | OK | OK | OK | NG | NG |

TABLE 3-continued

|  |  |  |  |  |  |  |  |  |  |  |  |  |  |  |  |
|---|---|---|---|---|---|---|---|---|---|---|---|---|---|---|---|
| 19 | OK | OK | OK | OK | OK | OK | OK | OK | OK | OK | OK | OK | OK | OK | NG | NG |
| 20 | OK | OK | OK | OK | OK | OK | OK | OK | OK | OK | OK | OK | OK | OK | NG | NG |
| 21 | OK | OK | OK | OK | OK | OK | OK | OK | OK | OK | OK | OK | OK | OK | NG | NG |
| 22 | OK | OK | OK | OK | OK | OK | OK | OK | OK | OK | OK | OK | OK | OK | NG | NG |
| 23 | OK | OK | OK | OK | OK | OK | OK | OK | OK | OK | OK | OK | OK | OK | NG | NG |
| 24 | OK | OK | OK | OK | OK | OK | OK | OK | OK | OK | OK | OK | OK | OK | NG | NG |
| 25 | OK | OK | OK | OK | OK | OK | OK | OK | OK | OK | OK | OK | OK | OK | NG | NG |
| 26 | OK | OK | OK | OK | OK | OK | OK | OK | OK | OK | OK | OK | OK | OK | NG | NG |
| 27 | OK | OK | OK | OK | OK | OK | OK | OK | OK | OK | OK | OK | OK | OK | NG | NG |
| 28 | OK | OK | OK | OK | OK | OK | OK | OK | OK | OK | OK | OK | OK | OK | NG | NG |
| 29 | OK | OK | OK | OK | OK | OK | OK | OK | OK | OK | OK | OK | OK | OK | NG | NG |
| 30 | OK | OK | OK | OK | OK | OK | OK | OK | OK | OK | OK | OK | OK | OK | NG | NG |
| 31 | OK | OK | OK | OK | OK | OK | OK | OK | OK | OK | OK | OK | OK | OK | NG | NG |
| 32 | OK | OK | OK | OK | OK | OK | OK | OK | OK | OK | OK | OK | OK | OK | NG | NG |
| 33 | OK | OK | OK | OK | OK | OK | OK | OK | OK | OK | OK | OK | OK | OK | NG | NG |
| 34 | OK | OK | OK | OK | OK | OK | OK | OK | OK | OK | OK | OK | OK | OK | NG | NG |
| 35 | OK | OK | OK | OK | OK | OK | OK | OK | OK | OK | OK | OK | OK | OK | NG | NG |
| 36 | OK | OK | OK | OK | OK | OK | OK | OK | OK | OK | OK | OK | OK | OK | OK | OK |
| 37 | OK | OK | OK | OK | OK | OK | OK | OK | OK | OK | OK | OK | OK | OK | OK | OK |
| 38 | OK | OK | OK | OK | OK | OK | OK | OK | OK | OK | OK | OK | OK | OK | OK | OK |
| 39 | OK | OK | OK | OK | OK | OK | OK | OK | OK | OK | OK | OK | OK | OK | OK | OK |
| 40 | OK | OK | OK | OK | OK | OK | OK | OK | OK | OK | OK | OK | OK | OK | OK | OK |
| 41 | OK | OK | OK | OK | OK | OK | OK | OK | OK | OK | OK | OK | OK | OK | OK | OK |
| 42 | OK | OK | OK | OK | OK | OK | OK | OK | OK | OK | OK | OK | OK | OK | OK | OK |

|  |  | Operating State Example ||||||||||||| |
|---|---|---|---|---|---|---|---|---|---|---|---|---|---|---|
|  |  | 17 | 18 | 19 | 20 | 21 | 22 | 23 | 24 | 25 | 26 | 27 | 28 | 29 | 30 |
| Operating State Example | 1 | OK | OK | OK | OK | OK | OK | OK | OK | OK | OK | OK | OK | OK | OK |
|  | 2 | OK | OK | OK | OK | OK | OK | OK | OK | OK | OK | OK | OK | OK | OK |
|  | 3 | OK | OK | OK | OK | OK | OK | OK | OK | OK | OK | OK | OK | OK | OK |
|  | 4 | OK | OK | OK | OK | OK | OK | OK | OK | OK | OK | OK | OK | OK | OK |
|  | 5 | OK | OK | OK | OK | OK | OK | OK | OK | OK | OK | OK | OK | OK | OK |
|  | 6 | OK | OK | OK | OK | OK | OK | OK | OK | OK | OK | OK | OK | OK | OK |
|  | 7 | OK | OK | OK | OK | OK | OK | OK | OK | OK | OK | OK | OK | OK | OK |
|  | 8 | OK | OK | OK | OK | OK | OK | OK | OK | OK | OK | OK | OK | OK | OK |
|  | 9 | OK | OK | OK | OK | OK | OK | OK | OK | OK | OK | OK | OK | OK | OK |
|  | 10 | OK | OK | OK | OK | OK | OK | OK | OK | OK | OK | OK | OK | OK | OK |
|  | 11 | OK | OK | OK | OK | OK | OK | OK | OK | OK | OK | OK | OK | OK | OK |
|  | 12 | OK | OK | OK | OK | OK | OK | OK | OK | OK | OK | OK | OK | OK | OK |
|  | 13 | OK | OK | OK | OK | OK | OK | OK | OK | OK | OK | OK | OK | OK | OK |
|  | 14 | OK | OK | OK | OK | OK | OK | OK | OK | OK | OK | OK | OK | OK | OK |
|  | 15 | NG | NG | NG | NG | NG | NG | NG | NG | NG | NG | NG | NG | NG | NG |
|  | 16 | NG | NG | NG | NG | NG | NG | NG | NG | NG | NG | NG | NG | NG | NG |
|  | 17 | NG | NG | NG | NG | NG | NG | NG | NG | NG | NG | NG | NG | NG | NG |
|  | 18 | NG | NG | NG | NG | NG | NG | NG | NG | NG | NG | NG | NG | NG | NG |
|  | 19 | NG | NG | NG | NG | NG | NG | NG | NG | NG | NG | NG | NG | NG | NG |
|  | 20 | NG | NG | NG | NG | NG | NG | NG | NG | NG | NG | NG | NG | NG | NG |
|  | 21 | NG | NG | NG | NG | NG | NG | NG | NG | NG | NG | NG | NG | NG | NG |
|  | 22 | NG | NG | NG | NG | NG | NG | NG | NG | NG | NG | NG | NG | NG | NG |
|  | 23 | NG | NG | NG | NG | NG | NG | NG | NG | NG | NG | NG | NG | NG | NG |
|  | 24 | NG | NG | NG | NG | NG | NG | NG | NG | NG | NG | NG | NG | NG | NG |
|  | 25 | NG | NG | NG | NG | NG | NG | NG | NG | NG | NG | NG | NG | NG | NG |
|  | 26 | NG | NG | NG | NG | NG | NG | NG | NG | NG | NG | NG | NG | NG | NG |
|  | 27 | NG | NG | NG | NG | NG | NG | NG | NG | NG | NG | NG | NG | NG | NG |
|  | 28 | NG | NG | NG | NG | NG | NG | NG | NG | NG | NG | NG | NG | NG | NG |
|  | 29 | NG | NG | NG | NG | NG | NG | NG | NG | NG | NG | NG | NG | NG | NG |
|  | 30 | NG | NG | NG | NG | NG | NG | NG | NG | NG | NG | NG | NG | NG | NG |
|  | 31 | NG | NG | NG | NG | NG | NG | NG | NG | NG | NG | NG | NG | NG | NG |
|  | 32 | NG | NG | NG | NG | NG | NG | NG | NG | NG | NG | NG | NG | NG | NG |
|  | 33 | NG | NG | NG | NG | NG | NG | NG | NG | NG | NG | NG | NG | NG | NG |
|  | 34 | NG | NG | NG | NG | NG | NG | NG | NG | NG | NG | NG | NG | NG | NG |
|  | 35 | NG | NG | NG | NG | NG | NG | NG | NG | NG | NG | NG | NG | NG | NG |
|  | 36 | OK | OK | OK | OK | OK | OK | OK | OK | OK | OK | OK | OK | OK | OK |
|  | 37 | OK | OK | OK | OK | OK | OK | OK | OK | OK | OK | OK | OK | OK | OK |
|  | 38 | OK | OK | OK | OK | OK | OK | OK | OK | OK | OK | OK | OK | OK | OK |
|  | 39 | OK | OK | OK | OK | OK | OK | OK | OK | OK | OK | OK | OK | OK | OK |
|  | 40 | OK | OK | OK | OK | OK | OK | OK | OK | OK | OK | OK | OK | OK | OK |
|  | 41 | OK | OK | OK | OK | OK | OK | OK | OK | OK | OK | OK | OK | OK | OK |
|  | 42 | OK | OK | OK | OK | OK | OK | OK | OK | OK | OK | OK | OK | OK | OK |

|  |  | Operating State Example |||||||||||| |
|---|---|---|---|---|---|---|---|---|---|---|---|---|---|
|  |  | 31 | 32 | 33 | 34 | 35 | 36 | 37 | 38 | 39 | 40 | 41 | 42 |
| Operating State Example | 1 | OK | OK | OK | OK | OK | OK | OK | OK | OK | OK | OK | OK |
|  | 2 | OK | OK | OK | OK | OK | OK | OK | OK | OK | OK | OK | OK |
|  | 3 | OK | OK | OK | OK | OK | OK | OK | OK | OK | OK | OK | OK |
|  | 4 | OK | OK | OK | OK | OK | OK | OK | OK | OK | OK | OK | OK |

TABLE 3-continued

| | | | | | | | | | | | | |
|---|---|---|---|---|---|---|---|---|---|---|---|---|
| 5 | OK | OK | OK | OK | OK | OK | OK | OK | OK | OK | OK | OK |
| 6 | OK | OK | OK | OK | OK | OK | OK | OK | OK | OK | OK | OK |
| 7 | OK | OK | OK | OK | OK | OK | OK | OK | OK | OK | OK | OK |
| 8 | OK | OK | OK | OK | OK | OK | OK | OK | OK | OK | OK | OK |
| 9 | OK | OK | OK | OK | OK | OK | OK | OK | OK | OK | OK | OK |
| 10 | OK | OK | OK | OK | OK | OK | OK | OK | OK | OK | OK | OK |
| 11 | OK | OK | OK | OK | OK | OK | OK | OK | OK | OK | OK | OK |
| 12 | OK | OK | OK | OK | OK | OK | OK | OK | OK | OK | OK | OK |
| 13 | OK | OK | OK | OK | OK | OK | OK | OK | OK | OK | OK | OK |
| 14 | OK | OK | OK | OK | OK | OK | OK | OK | OK | OK | OK | OK |
| 15 | NG | NG | NG | NG | NG | OK | OK | OK | OK | OK | OK | OK |
| 16 | NG | NG | NG | NG | NG | OK | OK | OK | OK | OK | OK | OK |
| 17 | NG | NG | NG | NG | NG | OK | OK | OK | OK | OK | OK | OK |
| 18 | NG | NG | NG | NG | NG | OK | OK | OK | OK | OK | OK | OK |
| 19 | NG | NG | NG | NG | NG | OK | OK | OK | OK | OK | OK | OK |
| 20 | NG | NG | NG | NG | NG | OK | OK | OK | OK | OK | OK | OK |
| 21 | NG | NG | NG | NG | NG | OK | OK | OK | OK | OK | OK | OK |
| 22 | NG | NG | NG | NG | NG | OK | OK | OK | OK | OK | OK | OK |
| 23 | NG | NG | NG | NG | NG | OK | OK | OK | OK | OK | OK | OK |
| 24 | NG | NG | NG | NG | NG | OK | OK | OK | OK | OK | OK | OK |
| 25 | NG | NG | NG | NG | NG | OK | OK | OK | OK | OK | OK | OK |
| 26 | NG | NG | NG | NG | NG | OK | OK | OK | OK | OK | OK | OK |
| 27 | NG | NG | NG | NG | NG | OK | OK | OK | OK | OK | OK | OK |
| 28 | NG | NG | NG | NG | NG | OK | OK | OK | OK | OK | OK | OK |
| 29 | NG | NG | NG | NG | NG | OK | OK | OK | OK | OK | OK | OK |
| 30 | NG | NG | NG | NG | NG | OK | OK | OK | OK | OK | OK | OK |
| 31 | NG | NG | NG | NG | NG | OK | OK | OK | OK | OK | OK | OK |
| 32 | NG | NG | NG | NG | NG | OK | OK | OK | OK | OK | OK | OK |
| 33 | NG | NG | NG | NG | NG | OK | OK | OK | OK | OK | OK | OK |
| 34 | NG | NG | NG | NG | NG | OK | OK | OK | OK | OK | OK | OK |
| 35 | NG | NG | NG | NG | NG | OK | OK | OK | OK | OK | OK | OK |
| 36 | OK | OK | OK | OK | OK | NG | NG | NG | NG | OK | OK | OK |
| 37 | OK | OK | OK | OK | OK | NG | NG | NG | NG | OK | OK | OK |
| 38 | OK | OK | OK | OK | OK | NG | NG | NG | NG | OK | OK | OK |
| 39 | OK | OK | OK | OK | OK | NG | NG | NG | NG | OK | OK | OK |
| 40 | OK | OK | OK | OK | OK | OK | OK | OK | OK | NG | NG | OK |
| 41 | OK | OK | OK | OK | OK | OK | OK | OK | OK | NG | NG | OK |
| 42 | OK | OK | OK | OK | OK | OK | OK | OK | OK | OK | OK | NG |

The actuation section 22 selects and executes from two to seven combinable operating state examples from among the operating state examples 1 to 42. Hereunder, a case where the actuation section 22 executes the operating state example 10 and the operating state example 31 is described. However, the actuation section 22 may also execute any one of the operating states 1 to 42. The overturn-notification-rider-informing-device 10 (the acquisition section 20 and the actuation section 22) is, for example, an ECU 41 in which an IC (semiconductor integrated circuit) and electronic parts or the like are mounted on a circuit board (see FIG. 2).

[Operations of Leaning-Vehicle-Overturn-Notification-System]

Figure 4:
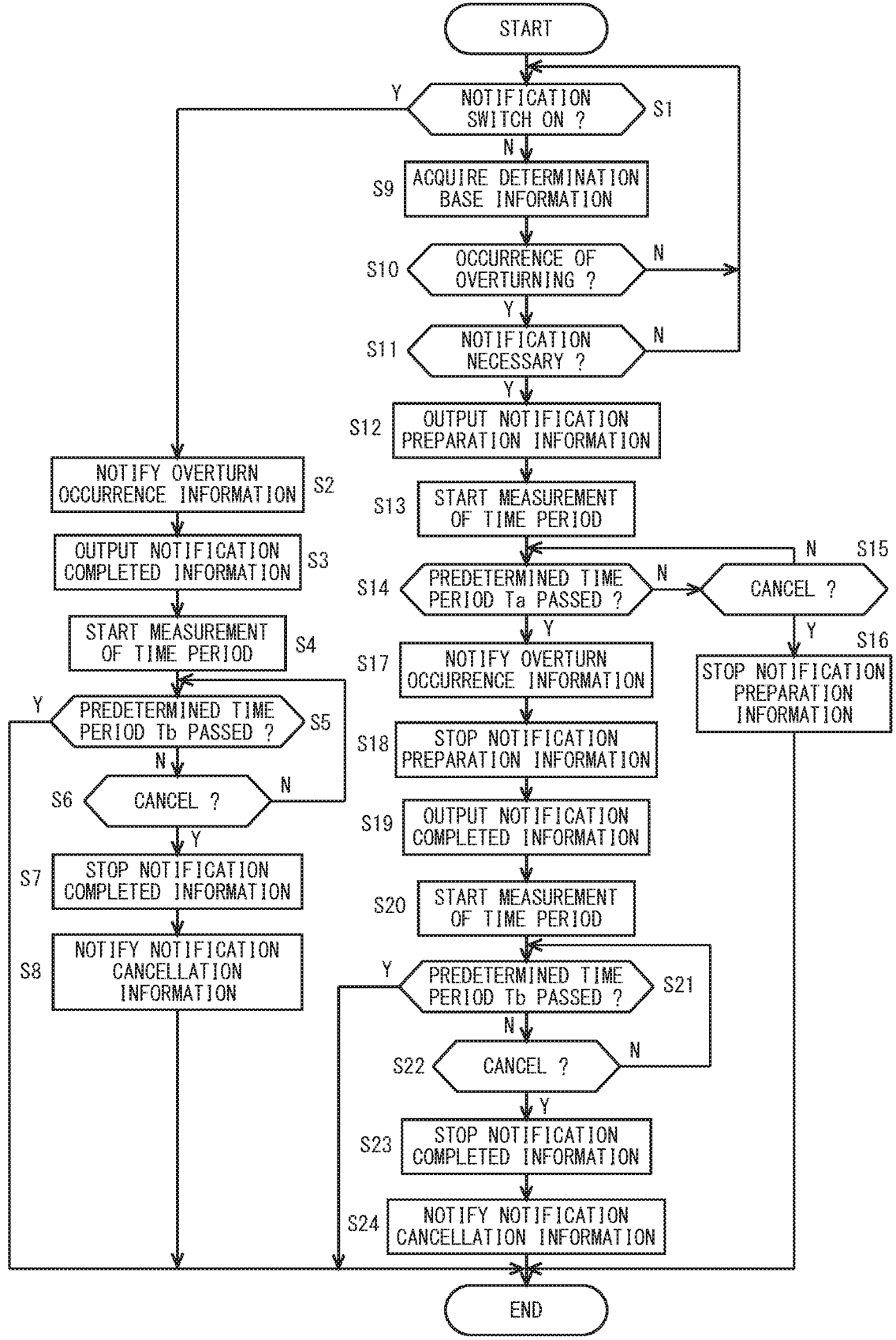
FIG. 4 is a flowchart of operations executed by a determination section 12.
Figure 5:
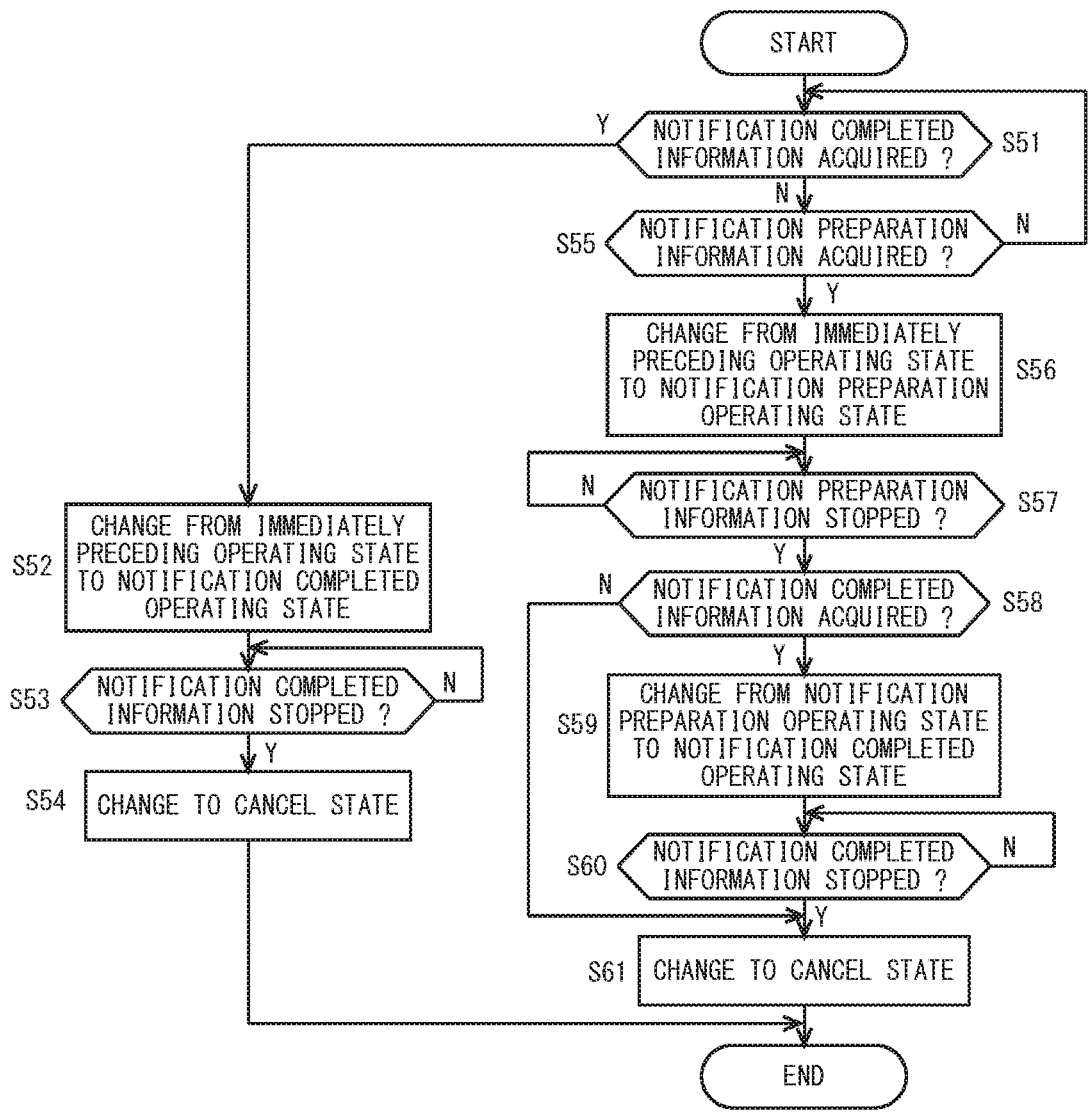
FIG. 5 is a flowchart of operations executed by an acquisition section 20 and an actuation section 22.

Next, operations of the leaning-vehicle-overturn-notification-system 1 will be described while referring to the attached drawings. FIG. 4 is a flowchart of operations that the determination section 12 executes. FIG. 5 is a flowchart of operations that the acquisition section 20 and the actuation section 22 execute. The operations of the determination section 12 shown in FIG. 4 and the operations of the acquisition section 20 and the actuation section 22 shown in FIG. 5 are executed simultaneously. However, for convenience of description, the operations of the determination section 12 shown in FIG. 4 and the operations of the acquisition section 20 and the actuation section 22 shown in FIG. 5 will be described separately.

First, the operations of the determination section 12 will be described while referring to FIG. 4. The present processing is started, for example, when an electric current is fed from an ignition power source of the motorcycle 2 and electric power is supplied to the overturn-notification-rider-informing-device 10 and the determination section 12. The overturn notification state q when the present processing starts is the non-notification state q1.

First, the determination section 12 determines whether or not the notification switch 17 is switched on (step S1). If the notification switch is switched on (Yes), the present processing proceeds to step S2. If the notification switch is not switched on (No), the present processing proceeds to step S9.

If the notification switch is switched on (Yes in step S1), the determination section 12 notifies of the overturn occurrence information Ia to the center 100 through the communication section 16 (step S2). As a result, the overturn notification state q changes from the non-notification state q1 to the notification completed state q3. In addition, the determination section 12 outputs the notification completed information I3 to the acquisition section 20 (step S3). After outputting the notification completed information I3, the determination section 12 starts measurement of a predetermined time period Tb (for example, 5 minutes) (step S4). Hereunder, the reason for measuring the predetermined time period Tb will be described. Even in a case where the leaning-vehicle-overturn-notification-system 1 notified of the overturn occurrence information Ia to the center 100, there are times when the rider 102 wishes to cancel the notification of the overturn occurrence information Ia that was notified of by the leaning-vehicle-overturn-notification-system 1 to the center 100. Therefore, until the predetermined time period Tb passes from step S4, by switching on the cancel switch 18 the rider 102 can cancel the notification of the overturn occurrence information Ia that was notified of by the leaning-vehicle-overturn-notification-system 1 to the center 100. On the other hand, after the predetermined time period Tb passes from step S4, even if the rider 102 switches on the cancel switch 18, notification of the overturn occurrence information Ia that was notified of to the center 100 by the leaning-vehicle-overturn-notification-system 1 is not cancelled. At such time, assistance is dispatched to the rider 102.

Next, the determination section 12 determines whether or not the predetermined time period Tb has passed from step S4 (step S5). If the predetermined time period Tb passed (Yes), the present processing ends. In this case, the center 100 dispatches assistance to the rider 102. If the predetermined time period Tb has not passed (No), the present processing proceeds to step S6.

If the predetermined time period Tb has not passed (No in step S5), the determination section 12 determines whether or not the cancel switch 18 has been switched on (step S6). If the cancel switch 18 has been switched on (Yes), the present processing proceeds to step S7. If the cancel switch 18 has not been switched on (No), the present processing returns to step S5.

If the cancel switch 18 has been switched on (Yes in step S6), the determination section 12 stops outputting the notification completed information I3 to the acquisition section 20 (step S7). In addition, the determination section 12 notifies of the notification cancellation information Ib (see FIG. 1) to the center 100 through the communication section 16 (step S8). By this means, the notification of the overturn occurrence information Ia that was notified of to the center 100 by the leaning-vehicle-overturn-notification-system 1 is cancelled. Thereafter, the present processing ends.

If the notification switch has not been switched on (No in step S1), the determination section 12 acquires the determination base information I1 from the sensor 14 (step S9). Based on the determination base information I1, the determination section 12 determines whether or not the motorcycle 2 changed from the travelling state Q1 to the overturned state Q2 (step S10). That is, the determination section 12 makes an overturn determination. If the motorcycle 2 changed to the overturned state Q2 (Yes), the present processing proceeds to step S11. If the motorcycle 2 has not changed to the overturned state Q2 (No), the present processing returns to step S1.

In a case where the motorcycle 2 changed to the overturned state Q2 (Yes in step S10), the determination section 12 determines whether or not it is necessary for the leaning-vehicle-overturn-notification-system 1 to notify of the overturn occurrence information Ia to the center 100 (step S11). That is, the determination section 12 makes a notification determination. In step S10, for example, the determination section 12 determines the size of the impact of overturning. In a case where the impact of overturning is relatively large, the determination section 12 determines that notification of the overturn occurrence information Ia is necessary (Yes). The overturn notification state q changes from the non-notification state q1 to the notification preparatory state q2. In this case, the present processing proceeds to step S12. In a case where the impact of overturning is relatively small, the determination section 12 determines that notification of the overturn occurrence information Ia is unnecessary (No). In this case, the present processing returns to step S1.

If notification is necessary (Yes in step S11), the determination section 12 outputs the notification preparation information I2 to the acquisition section 20 (step S12). The notification preparation information I2 is information indicating that the leaning-vehicle-overturn-notification-system 1 is preparing to notify the overturn occurrence information Ia to the center 100. In addition, simultaneously with the execution of step S12, the determination section 12 starts measurement of a predetermined time period Ta (for example, 30 seconds) (step S13). The determination section 12 determines whether or not the predetermined time period Ta has passed from step S13 (step S14). If the predetermined time period Ta has not passed (No), the present processing proceeds to step S15. If the predetermined time period Ta has passed (Yes), the present processing proceeds to step S17.

If the predetermined time period Ta has not passed (No in step S14), the determination section 12 determines whether or not the cancel switch 18 has been switched on (step S15). If the cancel switch 18 has been switched on (Yes), the present processing proceeds to step S16. If the cancel switch 18 has not been switched on (No), the present processing returns to step S14.

If the cancel switch 18 has been switched on (Yes in step S15), the determination section 12 stops outputting of the notification preparation information I2 to the acquisition section 20 (step S16). By this means, the preparation of the leaning-vehicle-overturn-notification-system 1 for notifying the overturn occurrence information Ia to the center 100 is cancelled. That is, the overturn occurrence information Ia is not notified of to the center 100. Thereafter, the present processing ends.

If the predetermined time period Ta has passed (Yes in step S14), the determination section 12 notifies the overturn occurrence information Ia to the center 100 through the communication section 16 (step S17). That is, the overturn notification state q changes from the notification preparatory state q2 to the notification completed state q3.

Next, the determination section 12 stops outputting of the notification preparation information I2 to the acquisition section 20 (step S18). In addition, the determination section 12 outputs the notification completed information I3 to the acquisition section 20 (step S19). Upon outputting the notification completed information I3, the determination section 12 starts measurement of the predetermined time period Tb (step S20).

Next, the determination section 12 determines whether or not the predetermined time period Tb has passed from step S19 (step S21). If the predetermined time period Tb passed (Yes), the present processing ends. In this case, the center 100 dispatches assistance to the rider 102. If the predetermined time period Tb has not passed (No), the present processing proceeds to step S22.

If the predetermined time period Tb has not passed (No in step S21), the determination section 12 determines whether or not the cancel switch 18 has been switched on (step S22). If the cancel switch 18 has been switched on (Yes), the present processing proceeds to step S23. If the cancel switch 18 has not been switched on (No), the present processing returns to step S21.

If the cancel switch 18 has been switched on (Yes in step S22), the determination section 12 stops outputting of the notification completed information I3 to the acquisition section 20 (step S23). In addition, the determination section 12 notifies of the notification cancellation information Ib to the center 100 through the communication section 16 (step S24). By this means, the notification of the overturn occurrence information Ia that was notified of to the center 100 by the leaning-vehicle-overturn-notification-system 1 is cancelled. Thereafter, the present processing ends.

Next, the operations of the acquisition section 20 and the actuation section 22 are described while referring to FIG. 5. The acquisition section 20 determines whether or not the notification completed information I3 was acquired from the determination section 12 (step S51). In step S51, the acquisition section 20 determines whether or not the determination section 12 outputted the notification completed information I3 in step S3 of FIG. 4. That is, the acquisition section 20 determines whether or not the notification switch 17 was switched on and the overturn notification state q changed from the non-notification state q1 to the notification completed state q3. If the notification completed information I3 has been acquired (Yes), the acquisition section 20 determines that the overturn notification state q changed from the non-notification state q1 to the notification completed state q3. Thereafter, the present processing proceeds to step S52. If the notification completed information I3 has not been acquired (No), the acquisition section 20 determines that the overturn notification state q has not changed from the non-notification state q1 to the notification completed state q3. Thereafter, the present processing proceeds to step S55.

If the notification completed information I3 has been acquired (Yes in step S51), the actuation section 22 changes the operating state of the light/sound generation sections 37 from the immediately preceding operating state P1 to the notification completed operating state P3 (step S52). By this means, the leaning-vehicle-overturn-notification-system 1 informs the rider 102 that the overturn notification state q is the notification completed state q3.

Next, the acquisition section 20 determines whether or not the notification completed information I3 is no longer being acquired from the determination section 12 (step S53). In step S53, the acquisition section 20 determines whether or not the determination section 12 stopped outputting the notification completed information I3 in step S7 of FIG. 4. That is, the acquisition section 20 determines whether or not it was determined that the cancel switch 18 was switched on in step S6. If the notification completed information I3 is being acquired (No), the acquisition section 20 determines that the cancel switch 18 has not been switched on. Thereafter, the present processing returns to step S53. In this case the actuation section 22 maintains the operating state of the light/sound generation sections 37 in the notification completed operating state P3. If the notification completed information I3 is not being acquired (Yes), the acquisition section 20 determines that the cancel switch 18 was switched on. Thereafter, the present processing proceeds to step S54.

If the notification completed information I3 is no longer being acquired (Yes in step S53), the actuation section 22 changes the operating state of the light/sound generation sections 37 from the notification completed operating state P3 to a cancel state (step S54). In the case where the notification completed information I3 is no longer being acquired, the actuation section 22 places at least one of the light/sound generation sections 37 in an operating state that is different from the state thereof when the acquisition section 20 is acquiring the notification completed information I3. By this means, the leaning-vehicle-overturn-notification-system 1 informs the rider 102 that notification of the overturn occurrence information Ia was cancelled. In the cancel state, for example, all of the light/sound generation sections 37 stop operating. Thereafter, the present processing ends.

If the notification completed information I3 is not being acquired (No in step S51), the acquisition section 20 determines whether or not the notification preparation information I2 was acquired from the determination section 12 (step S55). In step S55, the acquisition section 20 determines whether or not the determination section 12 output the notification preparation information I2 in step S12 of FIG. 4. That is, the acquisition section 20 determines whether or not the overturn notification state q changed from the non-notification state q1 to the notification preparatory state q2. If the notification preparation information I2 is not being acquired (No), the acquisition section 20 determines that the overturn notification state q is the non-notification state q1. Thereafter, the present processing returns to step S51. If the notification preparation information I2 was acquired (Yes), the acquisition section 20 determines that the overturn notification state q changed from the non-notification state q1 to the notification preparatory state q2. Thereafter, the present processing proceeds to step S56.

If the notification preparation information I2 was acquired (Yes in S55), the actuation section 22 changes the operating state of the light/sound generation sections 37 from the immediately preceding operating state P1 to the notification preparation operating state P2 (step S56). By this means the leaning-vehicle-overturn-notification-system 1 informs the rider 102 that the overturn notification state q is the notification preparatory state q2.

Next, the acquisition section 20 determines whether or not the notification preparation information I2 is no longer being acquired from the determination section 12 (step S57). In step S57, the acquisition section 20 determines whether or not the determination section 12 stopped outputting the notification preparation information I2 in step S16 or S18 of FIG. 4. If the notification preparation information I2 is being acquired (No), the present processing returns to step S57. In this case, the actuation section 22 maintains the operating state of the light/sound generation sections 37 in the notification preparation operating state P2. If the notification preparation information I2 is no longer being acquired (Yes), the present processing proceeds to step S58.

If the notification preparation information I2 is no longer being acquired (Yes in S57), the acquisition section 20 determines whether or not the notification completed information I3 was acquired from the determination section 12 (step S58). In step S58, the acquisition section 20 determines whether the reason the notification preparation information I2 is no longer being acquired is that the determination section 12 stopped outputting the notification completed information I3 in step S19 of FIG. 4, or is that it was determined that the cancel switch 18 was switched on in step S15 of FIG. 4. If the notification completed information I3 has been acquired (Yes), the acquisition section 20 determines that the overturn notification state q changed from the notification preparatory state q2 to the notification completed state q3. Thereafter, the present processing proceeds to step S59. If the notification completed information I3 has not been acquired (No), the acquisition section 20 determines that the cancel switch 18 was switched on. Thereafter, the present processing proceeds to step S61.

If the notification completed information I3 has been acquired (Yes in step S58), the actuation section 22 changes the operating state of the light/sound generation sections 37 from the notification preparation operating state P2 to the notification completed operating state P3 (step S59). By this means, the leaning-vehicle-overturn-notification-system 1 informs the rider 102 that the overturn notification state q is the notification completed state q3.

Next, the acquisition section 20 determines whether or not the notification completed information I3 is no longer being acquired from the determination section 12 (step S60). In step S60, the acquisition section 20 determines whether or not the determination section 12 stopped outputting the notification completed information I3 in step S23 of FIG. 4.

That is, the acquisition section 20 determines whether or not the cancel switch 18 was switched on in step S22. If the notification completed information I3 is being acquired (No), the acquisition section 20 determines that the cancel switch 18 has not been switched on. Thereafter, the present processing returns to step S60. In this case the actuation section 22 maintains the operating state of the light/sound generation sections 37 in the notification completed operating state P3. If the notification completed information I3 is not being acquired (Yes), the acquisition section 20 determines that the cancel switch 18 was switched on. Thereafter, the present processing proceeds to step S61.

If the notification completed information I3 is no longer being acquired (Yes in step S60), the actuation section 22 changes the operating state of the light/sound generation sections 37 from the notification completed operating state P3 to the cancel state (step S61). More specifically, in a case where the notification preparation information I2 and the notification completed information I3 are no longer being acquired, the actuation section 22 places at least one of the light/sound generation sections 37 in an operating state that is different from the state thereof when the acquisition section 20 is acquiring the notification preparation information I2 or the notification completed information I3. By this means, the leaning-vehicle-overturn-notification-system 1 informs the rider 102 that the preparation for notifying of the overturn occurrence information Ia was cancelled, or informs the rider 102 that notification of the overturn occurrence information Ia that was notified of was cancelled. In the cancel state, for example, all of the light/sound generation sections 37 stop operating. Thereafter, the present processing ends.

(Effects)

The overturn-notification-rider-informing-device 10 configured as described above can inform the rider 102 who is separated from the motorcycle 2 that preparation is underway to notify of the overturn occurrence information Ia. More specifically, in a case where the determination section 12 determines that the motorcycle 2 changed from the travelling state Q1 to the overturned state Q2, and that it is necessary to notify of the overturn occurrence information Ia to the center 100, the leaning-vehicle-overturn-notification-system 1 prepares to notify of the overturn occurrence information Ia to the center 100. In a state in which the leaning-vehicle-overturn-notification-system 1 is preparing to perform the notification (the notification preparatory state q2), the determination section 12 outputs, to the acquisition section 20, the notification preparation information I2 indicating that the leaning-vehicle-overturn-notification-system 1 is preparing to notify the overturn occurrence information Ia to the center 100. Based on the notification preparation information I2 that the acquisition section 20 acquired, the actuation section 22 actuates at least one of the light/sound generation sections 37 in an operating state that is different from the operating state thereof immediately before (at the timing t) the motorcycle 2 changed from the travelling state Q1 to the overturned state Q2. Therefore, the light radiation states or the sound generation states are different from each other, respectively, between the non-notification state q1 (the overturn notification state q at the timing t) and the notification preparatory state q2. Thus, by recognizing a change in the light radiation state or the sound generation state, the rider 102 who is separated from the motorcycle 2 can know that preparation is underway to notify of the overturn occurrence information Ia to the center 100. Further, by recognizing a change in the light radiation state or the sound generation state, a third party present in the area around the motorcycle 2 can also know that preparation is underway to notify of the overturn occurrence information Ia to the center 100.

Further, the overturn-notification-rider-informing-device 10 can inform the rider 102 who is separated from the motorcycle 2 that the overturn occurrence information Ia was notified of to the center 100. More specifically, in a state in which the leaning-vehicle-overturn-notification-system 1 notified of the overturn occurrence information Ia to the center 100 (the notification completed state q3), the determination section 12 outputs, to the acquisition section 20, the notification completed information I3 indicating that the leaning-vehicle-overturn-notification-system 1 notified of the overturn occurrence information Ia to the center 100. Based on the notification completed information I3 that the acquisition section 20 acquired, the actuation section 22 actuates at least one of the light/sound generation sections 37 in an operating state that is different from the operating state thereof in the notification preparatory state q2. Therefore, the light radiation states or the sound generation states are different from each other, respectively, between the notification preparatory state q2 and the notification completed state q3. Thus, by recognizing a change in the light radiation state or the sound generation state, the rider 102 who is separated from the motorcycle 2 can know that the overturn occurrence information Ia was notified of to the center 100. Further, by recognizing a change in the light radiation state or the sound generation state, a third party present in the area around the motorcycle 2 can also know that the overturn occurrence information Ia was notified of to the center 100.

According to the overturn-notification-rider-informing-device 10, there is a high probability that the rider 102 can know the overturn notification state q. More specifically, the actuation section 22 causes at least one of the image display section 24, the meter panel 26, the back light 28, the indicators 30, the front light 32, the buzzer 34 or the horn 36 to radiate light or to generate sound in a horizontal direction from the motorcycle 2 that is in an overturned state. There is a high probability that, in an overturned state, the motorcycle 2 will assume a posture in which a normal vector of the right side face or the left side face extends downward. Further, there is a high probability that the rider 102 who is separated from the motorcycle 2 will be on the ground. Therefore, there is a high probability that light that is radiated in a horizontal direction or sound that is generated in a horizontal direction will reach the rider 102. Hence, there is a high probability that the rider 102 can know the overturn notification state q based on light that is radiated in a horizontal direction or sound that is generated in a horizontal direction. Further, there is also a high probability that a third party present in the area around the motorcycle 2 can know the overturn notification state q based on light that is radiated in a horizontal direction or sound that is generated in a horizontal direction.

Further, as illustrated in FIG. 1, light radiated in a horizontal direction may be reflected by a wall in some cases. In such a case, the light that was reflected by the wall may reach the rider 102. Thus, even in a case where light radiated from the motorcycle 2 does not reach the rider 102 directly, the rider 102 can know the overturn notification state q. Furthermore, even in a case where light radiated from the motorcycle 2 does not directly reach a third party who is present in the area around the motorcycle 2, the third party who is present in the area around the motorcycle 2 can know the overturn notification state q.

Further, according to the overturn-notification-rider-informing-device 10, there is a high probability that the rider 102 can know the overturn notification state q. More specifically, the actuation section 22 actuates two or more components among the image display section 24, the meter panel 26, the back light 28, the indicators 30 and the front light 32 in an operating state that is different from the operating state of the relevant components immediately before the motorcycle 2 changed from the travelling state to the overturned state. In this case, there is a high probability that the motorcycle 2 that is in the overturned state will radiate light or generate sound in two or more horizontal directions. Therefore, there is a high probability that light that is radiated in a horizontal direction or sound that is generated in a horizontal direction will reach the rider 102. Hence, there is a higher probability that the rider 102 can know the overturn notification state q based on light that is radiated in a horizontal direction or sound that is generated in a horizontal direction. Further, there is also a higher probability that a third party present in the area around the motorcycle 2 can know the overturn notification state q based on light that is radiated in a horizontal direction or sound that is generated in a horizontal direction.

Further, the overturn-notification-rider-informing-device 10 can inform the rider 102 who is separated from the motorcycle 2 that the overturn-notification-rider-informing-device 10 cancelled preparation for notifying of the overturn occurrence information Ia, or that the overturn-notification-rider-informing-device 10 cancelled the notification of the overturn occurrence information Ia that was notified of. More specifically, in a case where the acquisition section 20 is no longer acquiring the notification preparation information I2 and the notification completed information I3, the actuation section 22 can determine that preparation for notifying of the overturn occurrence information Ia has been cancelled, or that notification of the overturn occurrence information Ia that was notified of has been cancelled. Therefore, in a case where preparation for notifying of the overturn occurrence information Ia has been cancelled or notification of the overturn occurrence information Ia that was notified of has been cancelled, the actuation section 22 places at least one of the light/sound generation sections 37 in an operating state that is different from the state thereof when the acquisition section 20 is acquiring the notification preparation information I2 or the notification completed information I3. By this means, the light radiation state or the sound generation state when preparing to notify of overturn occurrence information Ia or when overturn occurrence information Ia has been notified of are different from the light radiation state or the sound generation state when preparation for notifying of overturn occurrence information Ia has been cancelled or when the notification of overturn occurrence information Ia that was notified of has been cancelled. As a result, by recognizing a change in a light radiation state or a sound generation state, the rider 102 who is separated from the motorcycle 2 can know that preparation for notifying of the overturn occurrence information Ia has been cancelled, or that notification of the overturn occurrence information Ia that was notified of has been cancelled. Further, by recognizing a change in a light radiation state or a sound generation state, a third party present in the area around the motorcycle 2 can know that preparation for notifying of the overturn occurrence information Ia has been cancelled, or that notification of the overturn occurrence information Ia that was notified of has been cancelled.

Second Embodiment

Figure 6:
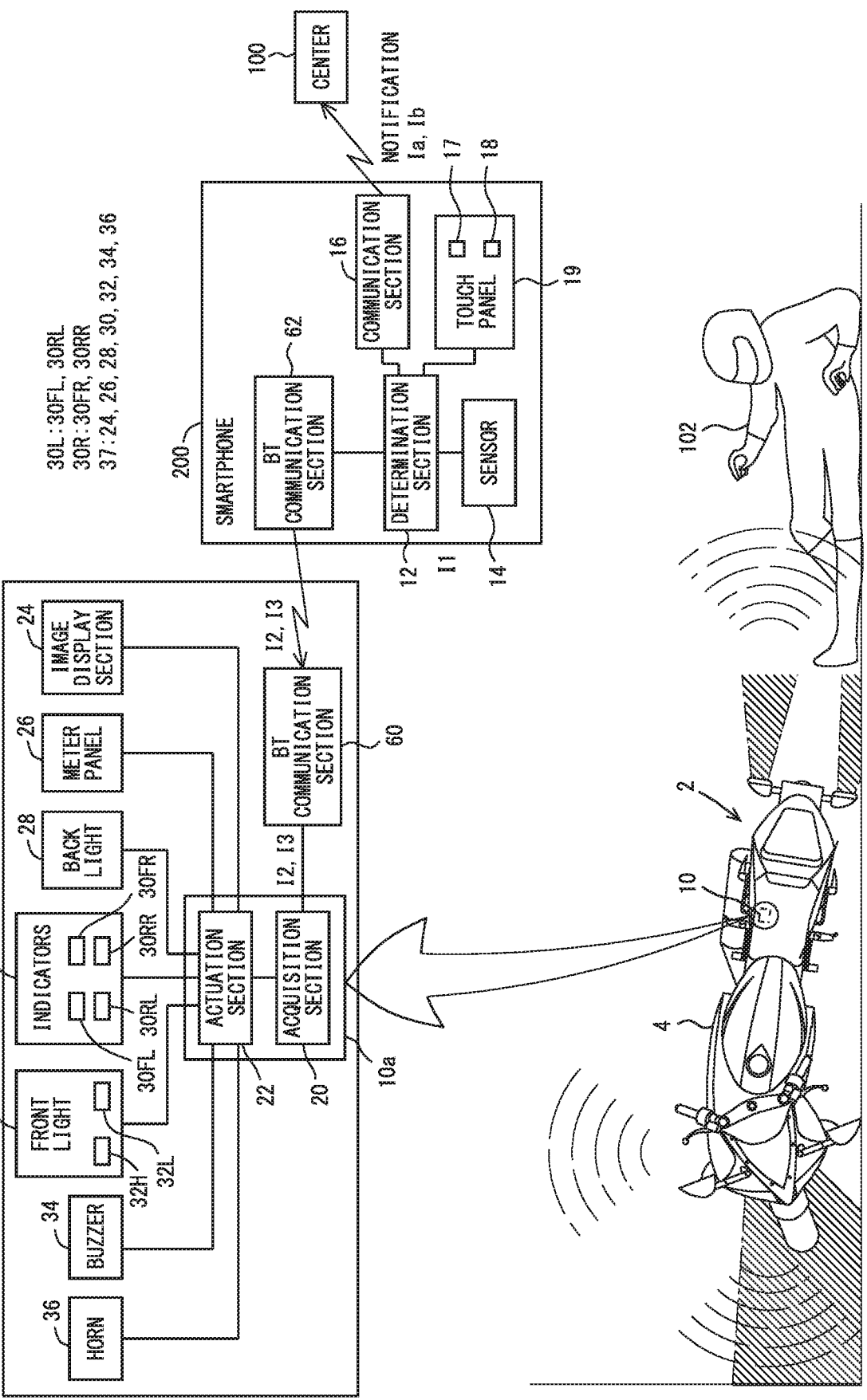

Hereunder, the configuration of a leaning-vehicle-overturn-notification-system including an overturn-notification-rider-informing-device according to a second embodiment is described while referring to the attached drawings. FIG. 6 is a functional block diagram of a leaning-vehicle-overturn-notification-system 1a.

The leaning-vehicle-overturn-notification-system 1a differs from the leaning-vehicle-overturn-notification-system 1 in the respect that the leaning-vehicle-overturn-notification-system 1a includes a smartphone 200. More specifically, the smartphone 200 is a radio communication terminal which the rider 102 has in their possession. The smartphone 200 makes an overturn determination and a notification determination based on the determination base information I1 that is acquired by a sensor 14 that is provided in the smartphone 200. In addition, in a case where the smartphone 200 makes an overturn change determination and a notification necessary determination, the smartphone 200 notifies of the overturn occurrence information Ia to the center 100. Furthermore, the smartphone 200 transmits the notification preparation information I2 and the notification completed information I3 to the motorcycle 2. To realize these operations, the smartphone 200 includes a determination section 12, the sensor 14, a communication section 16, a touch panel 19 and a BT communication section 62. In addition, an overturn-notification-rider-informing-device 10a and a BT communication section 60 are provided in the motorcycle 2.

The determination section 12, the sensor 14 and the communication section 16 of the leaning-vehicle-overturn-notification-system 1a perform the same operations as the determination section 12, the sensor 14 and the communication section 16 of the leaning-vehicle-overturn-notification-system 1. Therefore, a detailed description of the determination section 12, the sensor 14 and the communication section 16 of the leaning-vehicle-overturn-notification-system 1a is omitted here.

The touch panel 19 is an image display section and input section of the smartphone 200. The touch panel 19 displays a notification switch 17 and a cancel switch 18. When the rider 102 operates the notification switch 17 that is displayed on the touch panel 19, the determination section 12 notifies of the overturn occurrence information Ia to the center 100 through the communication section 16. Further, when the rider 102 operates the cancel switch 18 that is displayed on the touch panel 19, the determination section 12 notifies of the notification cancellation information Ib to the center 100 through the communication section 16.

The BT communication section 60 and the BT communication section 62 carry out radio communication by Bluetooth (registered trademark). In the leaning-vehicle-overturn-notification-system 1a, the determination section 12 outputs the notification preparation information I2 and the notification completed information I3 to an acquisition section 20 through the BT communication sections 60 and 62. The acquisition section 20 and an actuation section 22 (the overturn-notification-rider-informing-device 10a) of the leaning-vehicle-overturn-notification-system 1a perform the same operations as the acquisition section 20 and the actuation section 22 (the overturn-notification-rider-informing-device 10) of the leaning-vehicle-overturn-notification-system 1. Therefore, a detailed description of the acquisition section 20 and the actuation section 22 (the overturn-notification-rider-informing-device 10a) of the leaning-vehicle-overturn-notification-system 1a is omitted here.

For the same reasons as in the case of the overturn-notification-rider-informing-device 10, the overturn-notification-rider-informing-device 10a configured as described above can inform the rider 102 who is separated from the motorcycle 2 or a third party present in the area around the motorcycle 2 that preparation is underway to notify of the overturn occurrence information Ia. In addition, for the same reasons as in the case of the overturn-notification-rider-informing-device 10, the overturn-notification-rider-informing-device 10a can inform the rider 102 who is separated from the motorcycle 2 or a third party present in the area around the motorcycle 2 that the overturn occurrence information Ia was notified to the center 100. Furthermore, for the same reasons as in the case of the overturn-notification-rider-informing-device 10, according to the overturn-notification-rider-informing-device 10a the probability of the rider 102 or a third party present in the area around the motorcycle 2 knowing the overturn notification state q increases. In addition, for the same reasons as in the case of the overturn-notification-rider-informing-device 10, the overturn-notification-rider-informing-device 10a can inform the rider 102 who is separated from the motorcycle 2 or a third party present in the area around the motorcycle 2 that preparation for notifying the overturn occurrence information Ia has been cancelled or that notification of the overturn occurrence information Ia that was notified has been cancelled.

Third Embodiment

Hereunder, the configuration of a leaning-vehicle-overturn-notification-system including an overturn-notification-rider-informing-device according to a third embodiment is described while referring to the attached drawings. FIG. 7 is a functional block diagram of a leaning-vehicle-overturn-notification-system 1b.

The leaning-vehicle-overturn-notification-system 1b differs from the leaning-vehicle-overturn-notification-system 1a in the respect that a sensor 14 and a control section 64 are provided in the motorcycle 2. More specifically, the control section 64 transmits the determination base information I1 that the sensor 14 acquired to the BT communication section 62 of the smartphone 200 through the BT communication section 60. The determination section 12 makes an overturn determination and a notification determination based on the determination base information I1 that the BT communication section 62 received. The determination section 12 of the leaning-vehicle-overturn-notification-system 1b performs the same operations as the determination section 12 of the leaning-vehicle-overturn-notification-system 1a. Therefore, a detailed description of the determination section 12 of the leaning-vehicle-overturn-notification-system 1b is omitted here. The acquisition section 20 and an actuation section 22 (an overturn-notification-rider-informing-device 10b) of the leaning-vehicle-overturn-notification-system 1b perform the same operations as the acquisition section 20 and the actuation section 22 (the overturn-notification-rider-informing-device 10a) of the leaning-vehicle-overturn-notification-system 1a. Therefore, a detailed description of the acquisition section 20 and the actuation section 22 (the overturn-notification-rider-informing-device 10b) of the leaning-vehicle-overturn-notification-system 1b is omitted here.

For the same reasons as in the case of the overturn-notification-rider-informing-devices 10 and 10a, the overturn-notification-rider-informing-device 10b configured as described above can inform the rider 102 who is separated from the motorcycle 2 or a third party present in the area around the motorcycle 2 that preparation is underway to notify of the overturn occurrence information Ia. In addition, for the same reasons as in the case of the overturn-notification-rider-informing-devices 10 and 10a, the overturn-notification-rider-informing-device 10b can inform the rider 102 who is separated from the motorcycle 2 or a third party present in the area around the motorcycle 2 that the overturn occurrence information Ia was notified of to the center 100. Further, for the same reasons as in the case of the overturn-notification-rider-informing-devices 10 and 10a, according to the overturn-notification-rider-informing-device 10b the probability of the rider 102 or a third party present in the area around the motorcycle 2 knowing the overturn notification state q increases. In addition, for the same reasons as in the case of the overturn-notification-rider-informing-devices 10 and 10a, the overturn-notification-rider-informing-device 10b can inform the rider 102 who is separated from the motorcycle 2 or a third party present in the area around the motorcycle 2 that preparation for notifying of the overturn occurrence information Ia has been cancelled or that notification of the overturn occurrence information Ia that was notified has been cancelled.

Other Embodiments

The embodiments and modifications described and/or illustrated in this specification are described in order to facilitate understanding of the present invention, and do not limit the concept of the present disclosure. The foregoing embodiments and modifications can be changed or modified without departing from the gist thereof.

The gist in question also includes any embodiments including equivalent elements, corrections, deletions, combinations (for example, combinations of features across various embodiments and modifications), improvements, and/or changes that can be recognized by those having ordinary skill in the art based on the embodiments disclosed in this specification. The limitations of the appended claims should be broadly interpreted based on terms used in the appended claims, and the limitations should not be limited by the embodiments and modifications described in this specification or in the prosecution of the present application. The embodiments and modifications should be construed as non-exclusive. For example, in this specification the terms "preferably" and "may" are non-exclusive, and mean "preferable, but not limited to this" and "may be, but not limited to this".

The overturn-notification-rider-informing-device according to the present invention is not limited to the overturn-notification-rider-informing-devices 10, 10a and 10b, and can be changed within a range that does not depart from the gist thereof.

The leaning-vehicle-overturn-notification-systems 1, 1a and 1b each include the image display section 24, the meter panel 26, the back light 28, the indicators 30, the front light 32 and the buzzer 34. However, it is not necessary for the leaning-vehicle-overturn-notification-systems 1, 1a and 1b to include all of image display section 24, the meter panel 26, the back light 28, the indicators 30, the front light 32 and the buzzer 34, and it suffices that each of the leaning-vehicle-overturn-notification-systems 1, 1a and 1b includes at least one of the image display section 24, the meter panel 26, the back light 28, the indicators 30, the front light 32 or the buzzer 34.

In the leaning-vehicle-overturn-notification-systems 1, 1a and 1b, the actuation section 22 may inform the rider 102 of the overturn notification state q by only causing light to be radiated in a horizontal direction from the motorcycle 2 that is in an overturned state, or may inform the rider 102 of the overturn notification state q by only causing sound to be generated in a horizontal direction from the motorcycle 2 that is in an overturned state. Further, the actuation section 22 may inform the rider 102 of the overturn notification state q by causing light to be radiated and sound to be generated in a horizontal direction from the motorcycle 2 that is in an overturned state.

Note that, in the leaning-vehicle-overturn-notification-systems 1, 1a and 1b, the time t (see FIG. 3) may be the time at which the motorcycle 2 changed from the travelling state Q1 to the overturned state Q2.

Note that, in the leaning-vehicle-overturn-notification-systems 1, 1a and 1b, the immediately preceding operating state P1, the notification preparation operating state P2 and the notification completed operating state P3 are different from each other. However, the relation between the immediately preceding operating state P1, the notification preparation operating state P2 and the notification completed operating state P3 is not limited thereto. The following four relations are conceivable with respect to the relation between the immediately preceding operating state P1, the notification preparation operating state P2 and the notification completed operating state P3:

(A) The immediately preceding operating state P1 and the notification preparation operating state P2 are different states, and the immediately preceding operating state P1 and the notification completed operating state P3 are the same state;

(B) The immediately preceding operating state P1 and the notification preparation operating state P2 are different states, and the notification preparation operating state P2 and the notification completed operating state P3 are the same state;

(C) The immediately preceding operating state P1 and the notification completed operating state P3 are different states, and the notification preparation operating state P2 and the notification completed operating state P3 are the same state; and (D) The immediately preceding operating state P1 and the notification completed operating state P3 are different states, and the immediately preceding operating state P1 and the notification preparation operating state P2 are the same state.

In the leaning-vehicle-overturn-notification-systems 1, 1a and 1b, the notification preparatory state q2 need not exist. That is, the determination section 12 may notify of the overturn occurrence information Ia to the center 100 through the communication section 16 without waiting after making an overturn change determination. In this case, the immediately preceding operating state P1 and the notification completed operating state P3 are different from each other.

Note that the hardware configuration of the leaning-vehicle-overturn-notification-system 1 is not limited to the configuration illustrated in FIG. 2. In the configuration illustrated in FIG. 2, two ECUs, namely the ECUs 40 and 41 are provided. However, the ECUs 40 and 41 may be constituted by a single ECU.

In the leaning-vehicle-overturn-notification-systems 1, 1a and 1b, even in the notification completed state q3, by operating the cancel switch 18 the rider 102 can cancel the notification of the overturn occurrence information Ia that was notified of by the leaning-vehicle-overturn-notification-system 1 to the center 100. However, in the leaning-vehicle-overturn-notification-systems 1, 1a and 1b, a configuration may be adopted in which the rider 102 cannot cancel the notification of the overturn occurrence information Ia that was notified of by the leaning-vehicle-overturn-notification-system 1, 1a or 1b to the center 100, by operating the cancel switch 18.

In the leaning-vehicle-overturn-notification-systems 1, 1a and 1b, the determination section 12 executes the overturn determination in step S10 in FIG. 4 and the notification determination in step S11 in FIG. 4 as separate steps. However, the determination section 12 may execute the overturn determination and the notification determination in a single step. In this case, based on the determination base information I1, the determination section 12 determines whether or not the overturning of the motorcycle 2 is overturning for which it is necessary to notify of the overturn occurrence information Ia to the center 100 by radio communication.

In the leaning-vehicle-overturn-notification-systems 1, 1a and 1b, the rider 102 operates the notification switch 17 or the cancel switch 18. However, a third party present in the area around the motorcycle 2 may operate the notification switch 17 or the cancel switch 18.

REFERENCE SIGNS LIST 1, 1a, 1b: Leaning-vehicle-overturn-notification-system
2: Motorcycle
4: Vehicle Body
10, 10a, 10b: Overturn-notification-rider-informing-device
12: Determination Section
14: Sensor
16: Communication Section
17: Notification Switch
18: Cancel Switch
19: Touch Panel
20: Acquisition Section
22: Actuation Section
24: Image Display Section
26: Meter Panel
28: Back Light
30: Indicator
30FL: Left-front Indicator
30FR: Right-front Indicator
30L: Left Indicator
30R: Right Indicator
30RL: Left-rear Indicator
30RR: Right-rear Indicator
32: Front Light
32H: High-beam Light Source
32L: Low-beam Light Source
34: Buzzer
36: Horn
37: Light/Sound Generation Section
40, 41: ECU
42: Leaning Determination Sensor
44: Speed Sensor
46: Communication Module
48: Antenna
60, 62: BT Communication Section
64: Control Section
100: Center
102: Rider
200: Smartphone

What is claimed is:

1. An overturn-notification-rider-informing-device applied to a leaning-vehicle-overturn-notification-system, the leaning-vehicle-overturn-notification-system being configured to notify of overturn occurrence information indicating that a leaning vehicle changed from a travelling state to an overturned state to outside of the leaning vehicle by radio communication, the overturn-notification-rider-informing-device being mounted in the leaning vehicle, the leaning vehicle comprising:

a vehicle body that leans left when turning left and leans right when turning right; and at least one of a front light that illuminates an area in front of the vehicle body when the vehicle body is in an upright state, indicators, a back light, a meter panel, an image display section, a horn or a buzzer;

the overturn-notification-rider-informing-device comprising:

a leaning-vehicle-overturn-notification-information-acquisition-section that acquires notification preparation information indicating that the leaning-vehicle-overturn-notification-system is preparing to notify of the overturn occurrence information to outside of the leaning vehicle by the radio communication, or notification completed information indicating that the leaning-vehicle-overturn-notification-system has notified of the overturn occurrence information to outside of the leaning vehicle by the radio communication; and an overturn-notification-rider-informing-actuation-section that, based on the notification preparation information or the notification completed information acquired by the leaning-vehicle-overturn-notification-information-acquisition-section, causes light to be radiated or sound to be generated in a horizontal direction from the leaning vehicle that is in an overturned state by actuating at least one of the front light, the indicators, the back light, the meter panel, the image display section, the horn or the buzzer in an operating state that is different from an operating state at a time when, or immediately before, the leaning vehicle changes from the travelling state to the overturned state, and thereby informs a rider that the leaning-vehicle-overturn-notification-system is preparing to notify of the overturn occurrence information to outside of the leaning vehicle by the radio communication, or that the leaning-vehicle-overturn-notification-system has notified of the overturn occurrence information to outside of the leaning vehicle by the radio communication.

2. The overturn-notification-rider-informing-device according to claim 1, wherein:

in a case where the leaning-vehicle-overturn-notification-information-acquisition-section no longer acquires the notification preparation information and the notification completed information, the overturn-notification-rider-informing-actuation-section actuates at least one of the front light, the indicators, the back light, the meter panel, the image display section, the horn or the buzzer in an operating state that is different from an operating state in a state in which the leaning-vehicle-overturn-notification-information-acquisition- section is acquiring the notification preparation information or the notification completed information, and thereby the overturn-notification-rider-informing-device informs the rider that the leaning-vehicle-overturn-notification-system cancelled preparation for notifying of the overturn occurrence information to outside of the leaning vehicle by the radio communication or that the leaning-vehicle-overturn-notification-system cancelled notification of the overturn occurrence information that was notified of to outside of the leaning vehicle by the radio communication.

3. The overturn-notification-rider-informing-device according to claim 1, wherein:

the overturn-notification-rider-informing-actuation-section actuates two or more components among the front light, the indicators, the back light, the meter panel and the image display section.

4. The overturn-notification-rider-informing-device according to claim 1, wherein:

in a case where the front light, the meter panel or the image display section is unlit at a time when, or immediately before, the leaning vehicle changes from the travelling state to the overturned state, the overturn-notification-rider-informing-actuation-section informs the rider of the overturn notification state by causing the front light, the meter panel or the image display section to light up or to flash after the leaning vehicle changes from the travelling state to the overturned state; or in a case where the front light, the meter panel or the image display section is lit at a time when, or immediately before, the leaning vehicle changes from the travelling state to the overturned state, the overturn-notification-rider-informing-actuation-section informs the rider of the overturn notification state by causing the front light, the meter panel or the image display section to flash after the leaning vehicle changes from the travelling state to the overturned state.

5. The overturn-notification-rider-informing-device according to claim 1, wherein:

the front light includes a high-beam state in which a travelling headlight lights up, and a low-beam state in which a passing headlight lights up; and in a case where the front light is lit in the high-beam state or the low-beam state at a time when, or immediately before, the leaning vehicle changes from the travelling state to the overturned state, the overturn-notification-rider-informing-actuation-section informs the rider of the overturn notification state by alternately switching between the high-beam state and the low-beam state of the front light after the leaning vehicle changes from the travelling state to the overturned state.

6. The overturn-notification-rider-informing-device according to claim 1, wherein:

the indicators comprise a right indicator and a left indicator; and in a case where the right indicator and the left indicator are unlit at a time when, or immediately before, the leaning vehicle changes from the travelling state to the overturned state, the overturn-notification-rider-informing-actuation-section informs the rider of the overturn notification state by causing one or both of the right indicator and the left indicator to light up after the leaning vehicle changes from the travelling state to the overturned state, or by causing the right indicator and the left indicator to flash alternately after the leaning vehicle changes from the travelling state to the overturned state, or by causing the right indicator and the left indicator to flash simultaneously after the leaning vehicle changes from the travelling state to the overturned state, or by causing the right indicator or the left indicator to flash after the leaning vehicle changes from the travelling state to the overturned state.

7. The overturn-notification-rider-informing-device according to claim 1, wherein:
- the indicators comprise a right indicator and a left indicator;
- the right indicator and the left indicator are caused to simultaneously flash according to a first cycle when used as emergency stop lights; and
- in a case where the right indicator and the left indicator are simultaneously flashing according to the first cycle at a time when, or immediately before, the leaning vehicle changes from the travelling state to the overturned state, the overturn-notification-rider-informing-actuation-section informs the rider of the overturn notification state by causing the right indicator and the left indicator to simultaneously flash according to a second cycle that is different from the first cycle after the leaning vehicle changes from the travelling state to the overturned state.

8. The overturn-notification-rider-informing-device according to claim 1, wherein:
- the indicators comprise a right indicator and a left indicator; and
- in a case where the right indicator or the left indicator is flashing at a time when, or immediately before, the leaning vehicle changes from the travelling state to the overturned state, the overturn-notification-rider-informing-actuation-section informs the rider of the overturn notification state by causing the right indicator and the left indicator to light up after the leaning vehicle changes from the travelling state to the overturned state, or by causing the right indicator and the left indicator to flash alternately after the leaning vehicle changes from the travelling state to the overturned state, or by causing the right indicator and the left indicator to flash simultaneously after the leaning vehicle changes from the travelling state to the overturned state.

9. The overturn-notification-rider-informing-device according to claim 1, wherein:
- the indicators comprise a right indicator and a left indicator; and
- in a case where the right indicator and the left indicator are flashing simultaneously at a time when, or immediately before, the leaning vehicle changes from the travelling state to the overturned state, the overturn-notification-rider-informing-actuation-section informs the rider of the overturn notification state by causing one or both of the right indicator and the left indicator to light up after the leaning vehicle changes from the travelling state to the overturned state, or by causing the right indicator and the left indicator to flash alternately after the leaning vehicle changes from the travelling state to the overturned state.

10. The overturn-notification-rider-informing-device according to claim 1, wherein:
- in a case where the back light is unlit at a time when, or immediately before, the leaning vehicle changes from the travelling state to the overturned state, the overturn-notification-rider-informing-actuation-section informs the rider of the overturn notification state by causing the back light to light up or to flash after the leaning vehicle changes from the travelling state to the overturned state,
- in a case where the back light is lit at a time when, or immediately before, the leaning vehicle changes from the travelling state to the overturned state, the overturn-notification-rider-informing-actuation-section informs the rider of the overturn notification state by causing the back light to flash after the leaning vehicle changes from the travelling state to the overturned state,
- in a case where the back light is flashing at a time when, or immediately before, the leaning vehicle changes from the travelling state to the overturned state, the overturn-notification-rider-informing-actuation-section informs the rider of the overturn notification state by causing the back light to light up after the leaning vehicle changes from the travelling state to the overturned state, or
- in a case where the back light is flashing according to a third cycle at a time when, or immediately before, the leaning vehicle changes from the travelling state to the overturned state, the overturn-notification-rider-informing-actuation-section informs the rider of the overturn notification state by causing the back light to flash according to a fourth cycle that is different from the third cycle after the leaning vehicle changes from the travelling state to the overturned state.

11. The overturn-notification-rider-informing-device according to claim 1, wherein:
- in a case where the horn or the buzzer is not generating sound at a time when, or immediately before, the leaning vehicle changes from the travelling state to the overturned state, the overturn-notification-rider-informing-actuation-section informs the rider of the overturn notification state by causing the horn or the buzzer to intermittently or continuously generate sound after the leaning vehicle changes from the travelling state to the overturned state; or
- in a case where the horn is continuously generating sound at a time when, or immediately before, the leaning vehicle changes from the travelling state to the overturned state, the overturn-notification-rider-informing-actuation-section informs the rider of the overturn notification state by causing the horn to intermittently generate sound after the leaning vehicle changes from the travelling state to the overturned state.

12. A leaning vehicle, comprising:
- an overturn-notification-rider-informing-device according to claim 1.

* * * * *